(12) United States Patent  (10) Patent No.: US 8,500,450 B1
Taylor et al.  (45) Date of Patent: Aug. 6, 2013

(54) COMPUTER-IMPLEMENTED METHOD OF IMPROVING READING SKILLS

(75) Inventors: Stanford E. Taylor, Lloyd Harbor, NY (US); S. Mark Taylor, Charlotte, VT (US); Alexandra N. Spichtig, Essex Junction, VT (US)

(73) Assignee: Taylor Associates/Communications, Inc., Huntington Station, NY (US)

( * ) Notice: Subject to any disclaimer, the term of this patent is extended or adjusted under 35 U.S.C. 154(b) by 1419 days.

(21) Appl. No.: 12/175,062

(22) Filed: Jul. 17, 2008

Related U.S. Application Data

(60) Provisional application No. 60/950,151, filed on Jul. 17, 2007.

(51) Int. Cl.
*G09B 17/00* (2006.01)

(52) U.S. Cl.
USPC ............ 434/178; 434/156; 434/157; 434/179

(58) Field of Classification Search
USPC .................................................. 434/156–157
See application file for complete search history.

(56) References Cited

U.S. PATENT DOCUMENTS

| | | | | |
|---|---|---|---|---|
| 5,147,205 | A * | 9/1992 | Gross et al. | 434/169 |
| 6,056,551 | A * | 5/2000 | Marasco | 434/178 |
| 6,409,513 | B1 * | 6/2002 | Kawamura et al. | 434/178 |
| 7,062,220 | B2 * | 6/2006 | Haynes et al. | 434/353 |
| 2002/0091713 | A1 * | 7/2002 | Walker | 707/200 |
| 2005/0069849 | A1 * | 3/2005 | McKinney et al. | 434/178 |
| 2006/0069562 | A1 * | 3/2006 | Adams et al. | 704/251 |

OTHER PUBLICATIONS

S. Mark Taylor, Declaration of S. Mark Taylor: Non-Reading-Plus® Reading-Fluency Software Publicly Available Prior to Jul. 17, 2006; dated Dec. 6, 2011, and accompanying document entitled "Non Reading Plus® Reading-Fluency Software."
S. Mark Taylor, Declaration of S. Mark Taylor: Versions of Reading Plus® Software Systems Publicly Available Prior to Jul. 17, 2006; dated Dec. 6, 2011, and accompanying document entitled "Description of Reading Plus® Software System v3.5."

* cited by examiner

*Primary Examiner* — Robert J Utama
(74) *Attorney, Agent, or Firm* — Downs Rachlin Martin PLLC

(57) ABSTRACT

A method and software for presenting reading fluency training to a user via a computer. The method includes presenting reading lessons to the user in a variety of formats and automatedly collecting data on the user's performance. The method uses the collected data to dynamically vary presentation formats, rates and content of the reading lessons throughout a reading fluency training session.

102 Claims, 12 Drawing Sheets

COMPUTER-IMPLEMENTED METHOD OF IMPROVING READING SKILLS

RELATED APPLICATION DATA

This application claims the benefit of priority of U.S. Provisional Patent Application Ser. No. 60/950,151, filed Jul. 17, 2007, and titled "System And Method For Improving Reading Skills," which is incorporated by reference herein in its entirety.

FIELD OF THE INVENTION

The present invention generally relates to the field of reading skills training. In particular, the present invention is directed to a computer-implemented method of improving reading fluency skills.

BACKGROUND

Considerable emphasis is being placed today on the development of increased reading fluency, as stated by the findings of the National Reading Panel report in 2000, which stated, "Despite its importance as a component of skilled reading, fluency is often neglected in the classroom." This is unfortunate. If text is read in a laborious and inefficient manner, it will be difficult for a child to remember what has been read and to relate the ideas expressed in the text to his or her background knowledge. Recent research on the efficacy of certain approaches to increasing fluency has led to increased recognition of its importance in the classroom and to changes in instructional practices."

Reading research has demonstrated that extensive engagement in high-success silent reading practice is necessary for students to become proficient readers and independent learners. Several studies report that struggling readers are the least likely to engage in effective independent reading practice. In addition, studies reveal that many struggling students need practice building orthographic competencies, sustained attention and controlled repeat rereading with appropriately leveled texts. Most teachers lack the time and tools to effectively control, measure, and evaluate their students' silent reading skills.

SUMMARY OF THE DISCLOSURE

In one implementation, the present disclosure is directed to a method of performing reading fluency training via a computer having a visual display and a user interface. The method includes: presenting to a user, on the visual display, structured reading lessons of multiple formats including a multi-line reading format and a single-line reading format, wherein each of the structured reading lessons includes a set of reading-comprehension questions; capturing, by the computer, reading rate data for segments of the structured reading lessons presented in multi-line reading format and for segments of the structured reading lessons presented in single-line reading format; collecting, via the user interface, answers to each set of reading-comprehension questions provided by the user; using the answers to each set of reading comprehension questions to obtain at least one reading comprehension measure; continually assessing, via the computer, reading proficiency of the user as a function of the at least one reading comprehension measure and the reading rate data; and dynamically controlling selection of reading lesson presentation format from among the multiple formats based on, at differing times, one, the other, or both, of the reading rate data and the at least one reading comprehension measure.

In another implementation, the present disclosure is directed to a computer-readable medium containing computer-executable instructions for implementing a method of performing reading fluency training via a computer having a visual display and a user interface. The computer-executable instructions includes: a first set of computer-executable instructions for presenting to a user, on the visual display, structured reading lessons of multiple formats including an multi-line reading format and a single-line reading format, wherein each of the structured reading lessons includes a set of reading-comprehension questions; a second set of computer-executable instructions for capturing, by the computer, reading rate data for segments of the structured reading lessons presented in multi-line reading format and for segments of the structured reading lessons presented in single-line reading format; a third set of computer-executable instructions for collecting, via the user interface, answers to each set of reading-comprehension questions provided by the user; a fourth set of computer-executable instructions for using the answers to each set of reading comprehension questions to obtain at least one reading comprehension measure; a fifth set of computer-executable instructions for continually assessing, via the computer, reading proficiency of the user as a function of the at least one reading comprehension measure and the reading rate data; and a sixth set of computer-executable instructions for dynamically controlling selection of reading lesson presentation format from among the multiple formats based on, at differing times, one, the other, or both, of the reading rate data and the at least one reading comprehension measure.

In still another implementation, the present disclosure is directed to a method of performing a reading placement assessment. The method includes: presenting to a user, via a computer, reading selections each including a multi-line reading text and a set of reading-comprehension questions following that one of the reading selections; wherein the reading selections are chosen to have various readability levels; presenting to the user the multi-line reading text in a window on a display associated with the computer such that the multi-line reading text is removed from the window at a dynamic removal rate that is within controlled, level appropriate, rate parameters; collecting, via a computer user interface, answers to each set of reading-comprehension questions provided by the user; and dynamically assessing independent silent reading ability based measures of comprehension on the reading selections of the various readability levels.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure is directed to computer-based systems, methods and software that provide reading fluency, as well as other reading skills such as contextual analysis, vocabulary improvement, comprehension enhancement, and decoding approaches. The concepts embodied in these systems, methods and software provide unique approaches in the manner in which program content, rates of presentation and formats of training are automatically and continually adjusted according to student performance and needs to ensure adequate development of fluency in silent reading. These variations in training modalities are employed to individualize student learning and to ensure maximum reading proficiency development. It is noted that the phrase "structured silent reading" appears a number of times below as a simplified descriptor in connection with describing examples of this disclosure. It is noted, however, that in this disclosure and in the appended claims, this descriptor is intended to encompass at least all of the reading measures and skills mentioned in the first sentence of this paragraph.

Figure 1:
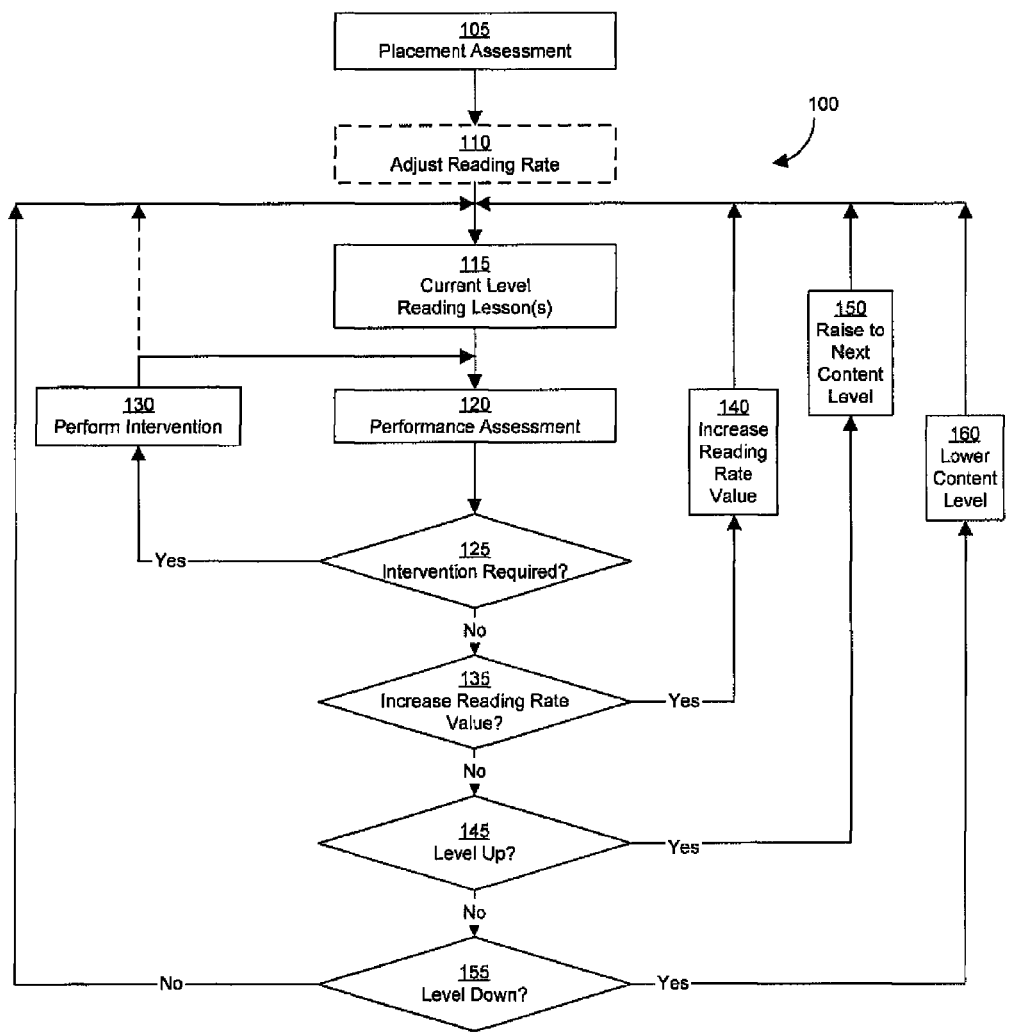
FIG. 1 is a flow diagram of a reading fluency training method.

Referring now to the drawings, FIG. 1 illustrates at a high level a reading fluency training method 100 that embodies broad concepts of the present invention. As will be appreciated, the various steps of method 100 can be readily implemented in computer software that is executable in any suitable computing environment, such as a standalone computing environment (e.g., on a desktop computer or laptop computer) and a computer network environment (e.g., a local area network, such as server/client network within a school, and a wide area network, such as the Internet), among others. An example of hardware that can be used to implement a reading fluency training method that utilizes broad concepts of the present disclosure, such as method 100, is described below in connection with FIG. 6. First, however, details of method 100 and other concepts of the present invention will be presented since, as those skilled in the art will readily appreciate, the implementation of these concepts in a particular computing environment would simply be a matter of choice, with skilled artisans being able to adapt the novel concepts of the present disclosure to the desired environment using routine programming practices and skills.

Reading fluency training method 100 begins at step 105 with a reading placement assessment. As described below in more detail, in this example the reading placement assessment can use a set of reading selections to automatedly assign the user to an appropriate content level with respect to vocabulary, content readability, comprehension, and reading rate. In one example, content levels can correspond directly to school grade level norm rates, such as appears in Table I, below. It is noted that reading placement lessons are typically, though not necessarily, more abbreviated than reading lessons presented in connection with other steps of method 100. This will be addressed in more detail below in connection with the example of FIG. 2. In conjunction with this content-level assignment, the reading placement assessment performed at step 105 may also be used to automatedly assign an initial reading rate value corresponding to the automatedly assigned content level of the user at issue. That said, in certain implementations of method 100, this initial reading rate value may be adjusted at the optional next step, i.e., step 110, wherein method 100 uses additional measures and methods to identify and confirm the initial reading rate.

In the reading rate value adjustment at step 110, the user is presented with a series of lessons selected based on content level assigned at step 105. Data regarding the user's performance on these lessons is collected and used to determine whether or not the initial reading rate value set in step 105 should be revised. If so, the initial reading rate value is updated at step 110 and method 100 continues to step 115. At step 115, one or more current-level lessons are presented to the user. Each reading lesson presented at step 115, as well as each reading lesson presented at steps 105, 110, typically includes a content-level-appropriate reading and one or more groups of questions, such as multiple-choice questions, for the user to answer about the reading. Readings suitable for use as a reading in the context of the present disclosure are well-known in the art, especially in the field of reading comprehension testing. Therefore, details of suitable readings need not be disclosed in any detail herein for those skilled in the art to understand and implement the broad concepts of the present disclosure.

In addition to content-level-appropriateness, each reading lesson can have any of a variety of formats that implement the current reading rate parameters. In most implementations, lessons are presented in differing formats at differing times throughout training. Generally, the differing formats differ in the manner in which the reading is parsed and presented to the user and how the questions are dispersed throughout the reading. Examples of differing reading parsings include: presenting the reading in its entirety and placing all questions at the end of the reading ("single segment parsing"); presenting the reading in two segments, with a first subset of the questions following the first segment and a second subset of the questions following the second segment ("two-segment parsing") or presenting all questions following the second segment; and presenting the reading in three or more segments, with a corresponding subset of the questions following each of the segments ("multi-segment parsing" ("multi," as used herein, meaning three or more)). Variations on the presentation of a reading include: presenting a segment in a full frame fashion presenting entire frames all at once for a certain period of time ("full-screen presentation"); presenting a segment in a buildup fashion so that multiple lines of a given frame are visible at once after suitable build-up from the top down before removed at a suitable rate from top down ("full-screen-build-up presentation"); presenting a segment a full line at a time ("single-line presentation"); presenting a segment line-by-line using a moving mask revealing and concealing text to guide the user through the line ("single-line-guided presentation"); presenting a segment line-by-line using a pacing element to guide the user through the line ("single-line-paced presentation"); and presenting a segment word-by-word ("word-by-word presentation").

When a reading is parsed into two or more segments, the differing segments can have differing presentations. For example, in a two-segment parsing, the first segment may have a full-screen build-up presentation, while the second segment may have a single-line presentation. Typically, a training session presents a variety of lessons of differing formats. Indeed, the present inventors have unexpectedly found that certain lesson formats and sequencing of formats achieve better silent reading fluency results than others. Details concerning the differing formats of lessons and their selection are described below.

Also at step 115, the user's answers to the questions accompanying each lesson are evaluated and data is collected on the user's performance on those questions. After a predetermined number (one or more) of reading lessons are presented at step 115, at step 120 the user's performance is assessed against certain established criteria that method 100 uses to determine future session and lesson customization such as for example: 1) whether a user-assisting intervention is necessary; 2) whether to adjust the reading rate presentation parameters and 3) whether to adjust the content level of the reading lesson(s) presented at step 115. Depending on how many lessons have been completed at the time of a current assessment, the assessment may be based on not only the performance during the most recent iteration, but also on performance during one or more earlier lessons. Examples of performance measures include: number of lessons completed; performance on the last reading lesson; average performance on a number of most recent reading lessons; performance on a particular segment of a reading parsed into two or more segments; and performance on a particular type of presentation over a number of prior such segments, among others. Each of these performance measures can be expressed conveniently, but not necessarily, as a percentage. Detailed examples of performance assessments that can be performed at step 120 are presented below in connection with the particular embodiment of FIGS. 2-5.

At step 125, it is determined whether or not the user's performance meets the established criteria for avoiding intervention. For example, if the users performance at the current assessment does not meet the established criteria, method 100 proceeds to step 130 wherein one or more intervention reading lessons are presented to the user in lieu of either or both of continuing with another lesson at the current content level and leveling-up to a lesson at a higher content level. Relative to the example performance measures mentioned above, when each of those measurements are compared to a corresponding established threshold measurement at step 125 so as to determine whether or not the user's performance meets the established requirement. For example, if the only performance measure is the performance on last reading lesson (expressed in percent of questions answered correctly) and the established threshold is, say, 70%, if user's actual performance on the last reading lesson was 65%, which indicates sub-threshold performance, then method 100 would proceed to step 130.

Depending on the design of the system, more than one performance measure can be used for the automated decision-making of method 100. For example, if the performance measures for a particular implementation are performance on the last reading lesson and the average performance on the last ten reading lessons, method 100 compares the measured values compared to the corresponding respective threshold values. The comparisons may also be operated on logically, for example, using a logic AND, a logic OR or a logic exclusive OR operation. That is, if the criteria is that method 100 will proceed to intervention at step 130 when the comprehension performance on the last lesson was less than 85% AND the average comprehension performance on the last eight lessons was less than 75%, then both criteria would have to be met for the method to enter an intervention session.

Intervention reading lessons can include lessons repeated from the reading lessons presented during one or more prior sessions from step 110. Each repeated lesson may be repeated using the same parsing and presentation as used in the corresponding lesson, or it may be repeated using a different parsing and/or different presentation. In addition, the repeated lesson may be performed at a different presentation rate that can be varied (or not) depending on magnitude of the difference between the user's performance and the established requirement(s). For example, if a particular lesson was presented as a full-screen-build-up presentation within initial rate parameters, the rate of presentation in the repeating of that lesson during an intervention session at step 130 may be maintained, increased or decreased to a second rate higher or lower than the first rate. In one example, rates may range from −50% to 50% higher, depending, for example, on how low the user's performance was compared to the established requirement(s).

Another style of lesson suitable for the intervention at step 130 is a pre-reading type lesson in which the user is presented with a portion of the lesson in the single line format before being presented with the entire reading in the prior format and presentation. During a pre-reading type intervention, the presentation rate can be the same or higher, relative to the current reading rate parameters, for example, from 0% to 100% faster rate than the current reading rate value. This change, if any, can be based on the user's performance relative to the predetermined requirement(s) used at steps 120 and 125.

Following an intervention session, the user's performance during the intervention session can be used at steps 120 and 125 to determine whether further intervention is necessary. That is, performance measures (such as percentage of questions answered correctly, number of intervention readings/lessons completed and rates used during the intervention readings/lessons, and combinations thereof) are collected during the intervention session and compared against appropriate pre-established criteria. In this scenario, method 100 proceeds from the intervention session at step 130 back to the performance assessment at step 120. A detailed example of this is presented below in connection with the embodiment of FIGS. 2-5. Alternatively, following intervention at step 130, method 100 may proceed back to step 115 with entry into another lesson that is performed referring to the same reading rate parameters used in the lesson just prior to entry into the intervention session at step 130. Here, too, performance measures acquired during the intervention session at step 130 may be used in the subsequent performance assessment at step 120 following the additional lesson at step 115.

When the performance measure(s) meet the pre-established requirement(s) at step 120 so as to avoid intervention, at step 135 one or more performance measures may be used to determine whether the current reading rate value should be increased. If so, method 100 increases the reading rate value at step 140 and then continues to another lesson at step 115 using the new reading rate parameters. Details regarding one example of decision-making that can be used to determine whether or not to increase the reading rate value is presented below in connection with FIGS. 2-5.

At step 145 performance measures assessed at step 120 may also be used to determine whether or not to level-up the content level of the current lesson(s) presented at step 115. If at step 145 the user should be leveled-up, then the current level is increased at step 150 before method 100 proceeds back to step 115 for presentation of one or more lessons. Depending on the structuring of the performance measures and use of the pre-established requirements, provisions could be made in various embodiments for leveling-up more than a single level at a time. For example, if the pre-established criteria is a two-tiered criteria, leveling-up a single level could occur when the performance measures fall within a specified range and leveling up two levels could occur if the user's performance exceeded that range. Those skilled in the art will readily appreciate that other leveling-up schemes are possible.

If at step 145 it is determined that the content level should not be leveled-up, method 100 may proceed to step 155 at which the performance assessment at step 120 can be used to determine whether the content level should be leveled-down to a lower level. If so, method 100 proceeds to step 160 where the current content level is lowered one or more content levels, depending on how much the user's performance differs from the requirements. The decision-making for leveling down can essentially be the same as for leveling-up, albeit opposite in nature. After the content level has been leveled down at step 160, method 100 proceeds to step 115 at which one or more lessons are presented at the newly lowered content level. If, on the other hand, it is determined at step 155 that the content level does not need to be leveled-down, then method 100 may proceed back to step 115 for the presentation of one or more lessons on the same content level that existed prior to the performance assessment at step 120.

Not explicitly reflected in the flowchart of FIG. 1, but which should be apparent to a skilled artisan, is the fact that method 100 can continue until the user has achieved a certain level of performance on the highest rate-track level. In addition, as those skilled in the software arts can appreciate, a software implementation of method 100 can include various features for allowing a user to leave and return to method 100 so that the training received by the user can be extended over multiple user-sessions that may continue, for example, over multiple days, months or even years. For example, a student may progress through lessons over several days during a week, complete a portion of the training during a month or two and then resume training at a later date or a student may need to continue with the training program during a subsequent year.

Example System

With various broad concepts of the present disclosure summarized above in connection with method 100 of FIG. 1, following are some specific examples and further details of these concepts as presented in the context of a specific implementation of a reading fluency system 200 (FIG. 2) utilizing broad concepts of the present disclosure, including concepts disclosed above in connection with method 100 of FIG. 1.

Automated Reading Placement Component

Figure 2:
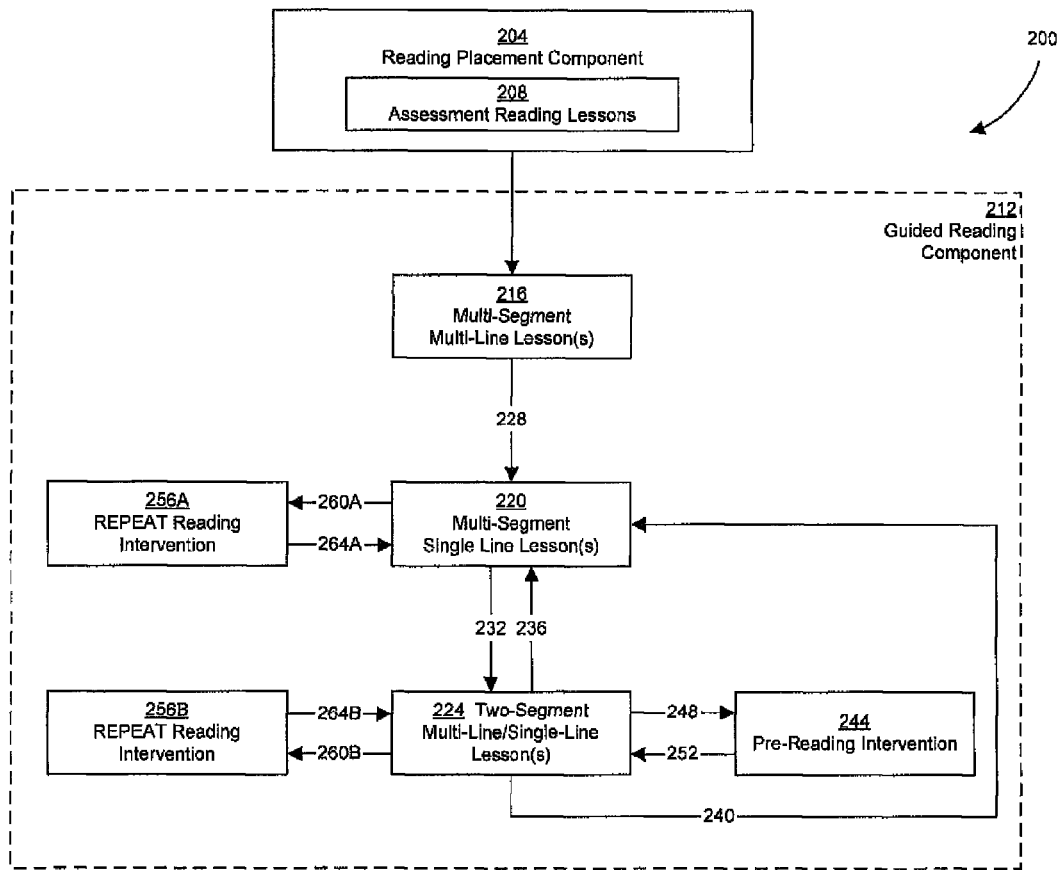
FIG. 2 is a high level block diagram of a guided reading component of a reading fluency training method.

Referring to FIG. 2, system 200 includes an automated reading placement component 204. Generally, reading placement component 204 performs a reading placement assessment similar to the reading placement assessment described above relative to step 105 of method 100 (FIG. 1). In this example, reading placement assessment component 204 of system 200 of FIG. 2 employs a unique method of automatedly assessing the user's reading proficiency. As mentioned above, a purpose of an automated reading placement assessment is to assign to each user the proper level of instructional content in relation to both the reading level of the content and the reading rate at which the content can be absorbed in terms of understanding as well as to determine independent reading proficiency levels for use in other external reading/instructional activities. Reading placement assessment component 204 presents a user with a series of assessment reading selections (individually and collectively indicated in FIG. 2 by element numeral "208" for convenience) at various content levels. Each assessment reading selection 208 is progressively deleted from top to bottom at a rate set to be at a particular value slower (e.g., 5% to 40% slower) than a "Norm" rate for the corresponding content level. Exemplary Norm rates based on research for each content/grade level are provided in the following Table I.

TABLE I

| Grade/Content Level | Norm Rate (words per minute) |
| --- | --- |
| 1 | 80 |
| 2 | 115 |
| 3 | 138 |
| 4 | 158 |
| 5 | 173 |
| 6 | 185 |
| 7 | 195 |
| 8 | 204 |
| 9 | 214 |
| 10 | 224 |
| 11 | 237 |
| 12 | 250 |
| College | 280 |

This manner of presenting assessment reading lessons 208 places a time constraint on the user to both read and comprehend. This technique encourages maximum attention by the user, as well as measures the degree of silent reading fluency or efficiency with which a user can read content. If the user cannot keep up with the disappearing text (i.e., cannot read the displayed text before it vanishes), they will not be able to answer the questions that follow each reading. A user who cannot maintain a minimum degree of fluency (e.g., a predetermined percentage, such as 5% to 30%, below the Norm rate for a given content level) is not proficient enough to start their practice at that level. The level at which a user can read with good comprehension at a qualifying rate determines the starting practice level of content they will encounter in a structured silent reading component 212 of system 200, which is described immediately below.

Silent Reading Component

To meet a multitude of diverse user needs, structured silent reading component 212 exposes the user to reading lessons of various presentation formats (in this example, multi-segment, multi-line lessons 216, multi-segment, single line lessons 220 and two-segment, multi-line/single line lessons 224) to better assist the user with getting started and making the transition more effectively to more rapid independent silent reading rates and to more difficult content. Following are details of the presentation formats used in system 200 to give the reader a better sense of these formats.

In this specific example, the formats of the fluency development reading lessons range from multi-segment parsed format (here, at lessons 216 and 220) in which the selected reading is divided into shorter reading segments, perhaps three to nine or more segments, to longer readings that are presented in a two-segment parsed format (here, at lessons 224). Further, this example presents the multi-segment reading lessons in a multi-line (line by line build up) reading format in lessons 216 and also in a paced left-to-right-guided, single-line reading format in lessons 220. Two-segment reading lessons 224 in this example are typically presented in a format in which the user reads the beginning, or first segment, of the reading in an independent fashion with the user's reading rate being monitored. Then the user completes the second segment of the reading in a paced left-to-right guided-single line reading format. On occasion both segments of a two-segment reading lesson will be presented in a guided-single line format. Should a student's multi-line reading performance be detected as a possible cause for poor comprehension or a student's suggest a compulsive slow reading behavior, both segments of the lesson could be presented in a paced single line format which presents print in a more sequential manner and demands more concentration. In a typical implementation of this example, the user will encounter five to twenty questions within reading lessons of the multi-segment format and five to ten questions within the reading lessons of the two-segment format. Those skilled in the art will understand that the number of questions used in each reading lesson, as well as the format of the lessons themselves, may be different from the corresponding items described in this example to suit a particular design.

Multi-Segment-Multi-Line Format

Figure 3:
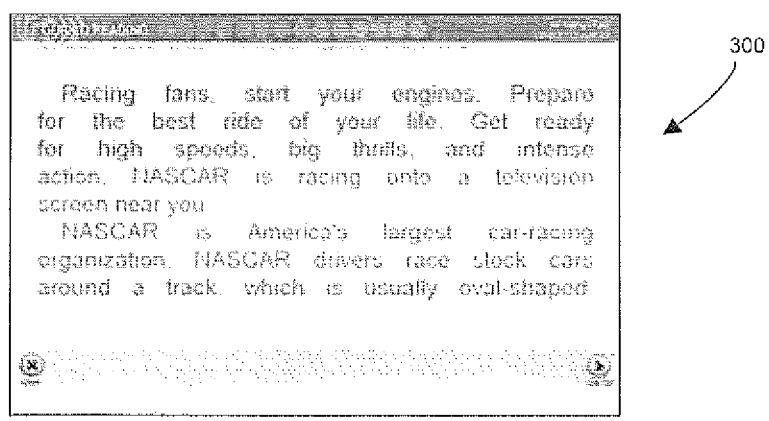
FIG. 3 is a screenshot of a display window of a graphical user interface as it displays a segment of a reading from the guided reading component of FIG. 2.

Structured silent reading component 212 typically starts the user with one or more reading lessons 216 presented in the multi-segment multi-line format in which text is built up on the screen from top to bottom at a rate in excess of the Norm rate (see Table I, above) for that level of content and removed at a rate slower than the Norm rate for that level of content. FIG. 3 illustrates an example of window 300 of a graphical user interface displaying the reading of a lesson presented in multi-segment multi-line format. For example, for someone reading third grade content, the build up rate could range between 200 to 400 words per minute based on a student's grade level and the text removal rate could range between 100 to 120 words per minute. Operationally, the user may, for example, click a graphically displayed "GoOn" button or other suitable button (e.g., using a mouse or other input device), or press a space bar on an accompanying computer keyboard, when they have completed their reading of each segment displayed. As the user reads each segment, system 200 calibrates and records the user's reading rate and answers to questions about that segment of the reading. In one example, structured silent reading component 212 typically requires the user to complete one or more multi-segment, multi-line lessons 216, depending on comprehension.

When the user has achieved a predetermined level of success (e.g., 70% to 95%) in answering questions of reading lessons 216 so as to indicate an acceptable level of attention and comprehension, structured silent reading component 212 assesses their average reading rate within the various segments of that qualifying lesson and uses that average rate as the basis to assign an initial rate for the multi-segment single line reading lessons 220. The assignment of that average reading rate and its use as input to reading lessons 220 is represented in FIG. 2 by arrow 228. If the user does not achieve the required comprehension level within three lessons, system 200 assesses the various reading rates achieved thus far by the user and assigns a start rate value based on the comprehension and rate performance within the various lessons and places the student at a safe starting rate. For example, for a user reading third level content who completes three lessons with less than a certain comprehension, such as 50% to 65% comprehension, and rates ranging between, say, 100 and 130 words per minute, system 200 might assign to that user a start rate as low as 90 words per minutes to ensure a safe starting point.

Multi Segment, Single Line Presentation

Figure 4:
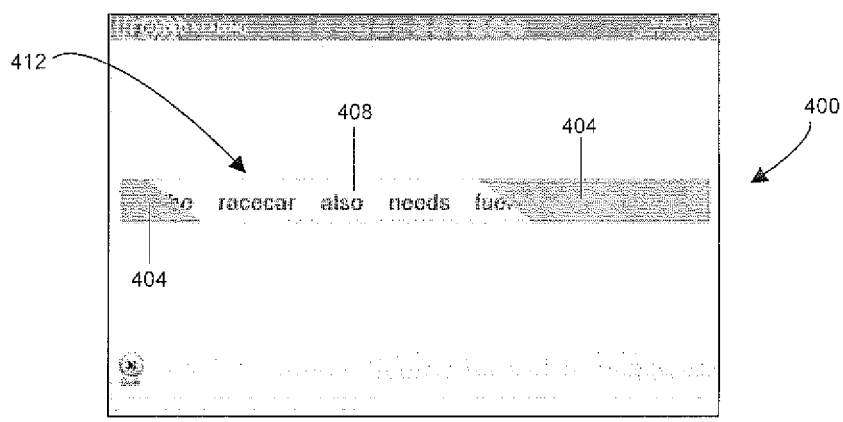
FIG. 4 is a screenshot of a display window of a graphical user interface as it displays a line of text and a moving text mask.

Structured silent reading component 212 most typically presents each user multi-segment, single-line lessons 220 in which system 200 displays single lines of print in a paced left-to-right presentation format wherein the line-by-line presentations will involve a moving mask (or window) that reveals a predetermined amount (e.g., 30-50%) of each line of text as it moves from the left to the right side of the line of text to control the rate and directionality by which the student views the line of text. FIG. 4 illustrates an example of window 400 of a graphical user interface displaying the reading of a lesson presented in moving mask format.

Structured silent reading component 212 may present a user working within higher reading rates (e.g., 300-399 words per minute) paced lines wherein a whole line display is accompanied by a pacing element, such as a pacing line, at a rate that is in excess of, or equal to, the rate at which the student has demonstrated the ability to comprehend to indicate the desired rate of reading or, alternatively, with a whole line of text without a pacing element (e.g., at a reading rate of 400 words per minute or higher) displayed at a rate in excess of, or equal to, the rate at which the student has demonstrated the ability to comprehend to allow the user to move across the line of print in a more individualized manner while maintaining the desired rate of reading. In one example, multi-segment, single-line reading lessons 220 contain ten to twenty skill-coded questions interspersed between the multiple segments of each reading.

In this example, structured silent reading component 212 will advance the user to two-segment, multi-line/single line format reading lessons 224 once they achieve a predetermined average comprehension score over a predetermined number of lessons, for example, 65% to 80% or higher for the last five lessons. This advancement is indicated in FIG. 2 by arrow 232. If the user is working within two-segment, multi-line/single line format reading lessons 224 and their average comprehension for a predetermined number of lessons, for example, the last five lessons, drops below a predetermined comprehension average (e.g., 55%), as indicated by arrow 236, structured silent reading component 212 will return to shorter and easier-to-attend-to multi-segment, single-line format reading lessons 220 until their average comprehension percentage is greater than a predetermined comprehension average (e.g., 65%) again, at which point they will move back to two-segment, multi-line/single line format reading lessons 224.

System 200 may also return the user to multi-segment, single-line format reading lessons 220 when it moves the user to the next higher readability level content, as indicated by loop path 240. Again, when structured silent reading component 212 determines that the user's average comprehension percentage is greater than a predetermined percentage (e.g., 80%), system 200 may return the user to two-segment, multi-line/single line format reading lessons 224 (see arrow 232).

Two-Segment Multi-Line/Single Line Presentation

In each lesson of two-segment, multi-line/single line format reading lessons 224, structured silent reading component 212 presents to the user a first segment of the corresponding reading in multi-line manner in which the lines build up from top to bottom and are eliminated from top to bottom to motivate attention and to encourage the user to read at acceptable rates. After completing the reading of a frame the student can manually advance to the next frame at any time by clicking the GoOn button (or using the spacebar). System 200 times the user's reading rates during this portion. Multi-segment reading is regarded as a student's independent reading performance (or i-rate). Structured silent reading component 212 presents the second segment of the lesson in a single line fashion in which a mask, such as mask 404 of FIG. 4, displays a portion of the line of text in a timed and paced left-to-right manner to encourage better directionality in reading. The mask reveals and conceals text at a rate that is in excess of, or equal to, the rate at which the user has demonstrated the ability to comprehend. This mask is used if the reading rate is below 300 words per minute. In one example, when system 200 is being used by a user working within higher reading rates (e.g., 300-400 words per minute), structured silent reading component 212 presents to the user paced lines wherein a whole line display is accompanied by a pacing element at a rate that is in excess of, or equal to, the rate at which the user has demonstrated the ability to comprehend to indicate the desired rate of reading or, alternatively, wherein a whole line without a pacing element (e.g., when the system measures the user's reading rate to be above 400 words per minute) is displayed at a rate in excess of, or equal to, the rate at which the user has demonstrated the ability to comprehend to allow the user to move across the line of print in a more individualized manner while maintaining the desired rate of reading. Single line reading is regarded as a student's guided reading performance (or g-rate). In a particular example, two-segment, multi-line/single line format reading lessons 224 contain ten skill coded questions that system 200 presents to the user after the user has read the two segments of a current lesson. Structured silent reading component 212 will keep presenting two-segment, multi-line/single line format reading lessons 224 until their average comprehension over a predetermined number of lessons drops below a predetermined average comprehension score (i.e. 50%).

Pre-Reading Intervention

In this example, structured reading component 212 includes a pre-reading intervention 244 that system 200 automatically presents to the user working in two-segment, multi-line/single line format reading lessons 224 when the user's independent reading rate, or "I-rate," (i.e., the rate in multi-line format) is significantly below their guided reading rate, or "G-rate," (i.e., the rate in single line format). This is indicated by arrow 248 in FIG. 2. During pre-reading intervention 244, structured silent reading component 212 twice presents to the user the first segment of one of two-segment, multi-line/single line format reading lessons 224. In the first presentation, structured silent reading component 212 presents the first segment in either a guided-single line format (e.g., masked, pacing element, whole line) at a rate that is in excess of or equal to the student's current reading rate to help the student adjust to higher rates of reading or, alternatively, a word-by-word format during which each word is displayed in the same viewing location at a rate that is in excess of, or equal to, the user's current practice rate to eliminate saccadic eye movement during reading so as to allow higher rates to be achieved. Then, structured silent reading component 212 re-presents the first segment in the regular independent, multi-line format. In this example, structured silent reading component 212 presents to the user the second segment of the lesson in the normal presentation used for the presentation of the second segment in two-segment, multi-line/single line format reading lessons 224, i.e., in guided-single-line presentation. In one implementation, each lesson in pre-reading intervention 244 contains ten skill coded questions that structured silent reading component 212 presents after it has presented the second segment of the lesson. After pre-reading intervention 244, system 200 may return the user to two-segment, multi-line/single line format reading lessons 224 as indicated by arrow 252 if the student's multi line reading performance has improved by a sufficient amount (i.e. at least 5%) otherwise the student may be presented with another pre-reading intervention 224.

Repeat Reading Intervention

In this example, structured silent reading component 212 includes a repeat reading intervention 256A-B for each of multi-segment, single-line format reading lessons 220 and two-segment, multi-line/single-line format reading lessons 224. System 200 automatically presents repeat reading interventions 256A-B if the average comprehension percentage over a given number of lessons in the corresponding one of multi-segment, single-line format reading lessons 220 and two-segment, multi-line/single-line format reading lessons 224 fall below an acceptable level. This is indicated by corresponding respective arrows 260A-B in FIG. 2. For example, such acceptable level may be deemed to be a particular percentage of correct answers, such as 60% to 80% over a predetermined number of lessons. In repeat reading intervention, structured silent reading component 212 presents lessons in the multi-segment, single-line paced format (mask, pacing line, whole line) and at a rate that is at the user's current reading rate, slightly above or below. Lessons presented in repeat reading interventions 256A-B may contain ten additional questions (e.g., up to twenty questions total) interspersed between the reading segments to enhance the user's comprehension of the reading presented. Following a repeat reading intervention 256A-B and as indicated by corresponding respective arrows 264A-B, system 200 returns the user to a new reading lesson in the "regular" lesson presentation format that preceded the repeat lesson, i.e., the system returns the user to a lesson in either multi-segment, single-line format reading lessons 220 or two-segment, multi-line/single-line format reading lessons 224.

In one instantiation of system 200 in software, it is noted that the system may be configured so that in situations where a user's progress is monitored by a teacher or other administrator, reading lesson presentation formats can be made available and can be assigned on an as-needed basis. Following are two examples of possible additional presentation formats. It is noted that in other embodiments of a system made in accordance with the broad concepts of the present disclosure that these, and other, presentation formats may be used in lieu of or in conjunction with any one or more of the presentation formats utilized in system 200.

Two-Segment, Multi-Line Presentation

In a two-segment, multi-line presentation format, a reading fluency system of the present disclosure, such as system 200 of FIG. 2, would present both of the two reading segments in a multi-line manner in which the lines build up from top to bottom and are eliminated from top to bottom to motivate attention and to encourage students to read at acceptable rates. In one example implementation, the lessons using this format could contain ten skill-coded questions presented after the user reads the two segments. In an intervention context, lessons of this two-segment, multi-line presentation format could proceed on this basis until the user is returned to the regular format.

Two-Segment, Single Line Presentation

In a two-segment, single-line presentation format, a reading fluency system of the present disclosure, such as system 200 of FIG. 2, would present both segments in a single line fashion in which a mask (or window) displays a portion of the line of print in a left-to-right and paced manner to encourage better directionality in reading. Such system could be configured so that users working within higher reading rates (e.g., 300-400 words per minute) may encounter a pacing element and paced whole lines paced if rates are above 400 words per minute. In one example implementation, the lessons using this format could contain ten skill-coded questions presented after the user read the two segments. In an intervention context, lessons of this two-segment, single-line presentation format could proceed on this basis until the user is returned to the regular format.

Multimedia

In a particular instantiation of reading fluency training system 200, the system is configured so that at virtually all times during the training narrator-delivered messages are available to the user that provide detail instructions for ensuring that variations in lesson presentation are clear to the user and that the user clearly understands each step of every lesson, regardless of presentation format. A further uniqueness of fluency development training implemented in accordance with the broad concepts of the present invention is the process of generating and presenting user motivational records and audio comments. Such motivational records clearly depict a user's progress in real time in terms of his/her rate and comprehension. Goal-setting is key to user motivation and success and to establish in any user his/her responsibility for success and advancement. Should a user not respond to all of the automatic interventions in terms of presentation, format and rate variations, the system will place the user on "hold," which signals the need for intervention by the appropriate administrator or reading fluency training professional.

Automatic Reading Rate Adjustments

Referring again to FIG. 2, once structured silent reading component 212 has established a start rate (in this example using multi-segment, multi-line presentation format lessons 216), system 200 adjusts rates dynamically based on real-time user performance. In this example instantiation, there are three possible increments that structured silent reading component 212 used to increase each user's rate. Structured silent reading component 212 utilizes increments of three differing sizes (big, medium and small), with the values within each size varying depending on the current content level, users grade level, number of lessons completed and users comprehension on completed reading lessons, here, lessons 216, 220, 224.

In a usual instantiation, structured silent reading component 212 starts all users on the medium increment for their grade level. System 200 is configured to monitor rate progress and comprehension on an ongoing basis and make increment adjustments as deemed appropriate. For example, if a student was able to complete an average number of lessons with good comprehension the increment may remain at a medium interval. If, however, less than acceptable number of lessons were satisfactory the rate increment might be lowered to smaller interval. By contrast, if the comprehension performance was satisfactory on most lessons the rate interval would be increased to a larger value.

Rate Stabilization

Silent reading fluency training system 200 is configured to stabilize guided reading rates at various stages throughout the training. For example, a student's rate may be stabilized at a level stabilization target rate for the content level a user is currently working within. The goal of stabilizing is to allow students to practice at newly achieved rates for a period of time to prepare them for the new target rates that will be set as they move to higher level content for example. Once the user has demonstrated comprehension competency, rates will continue to be raised, until new stabilization target rates are reached, at which point the rate stabilizes again.

Content Level-Up Logic

Figure 5:
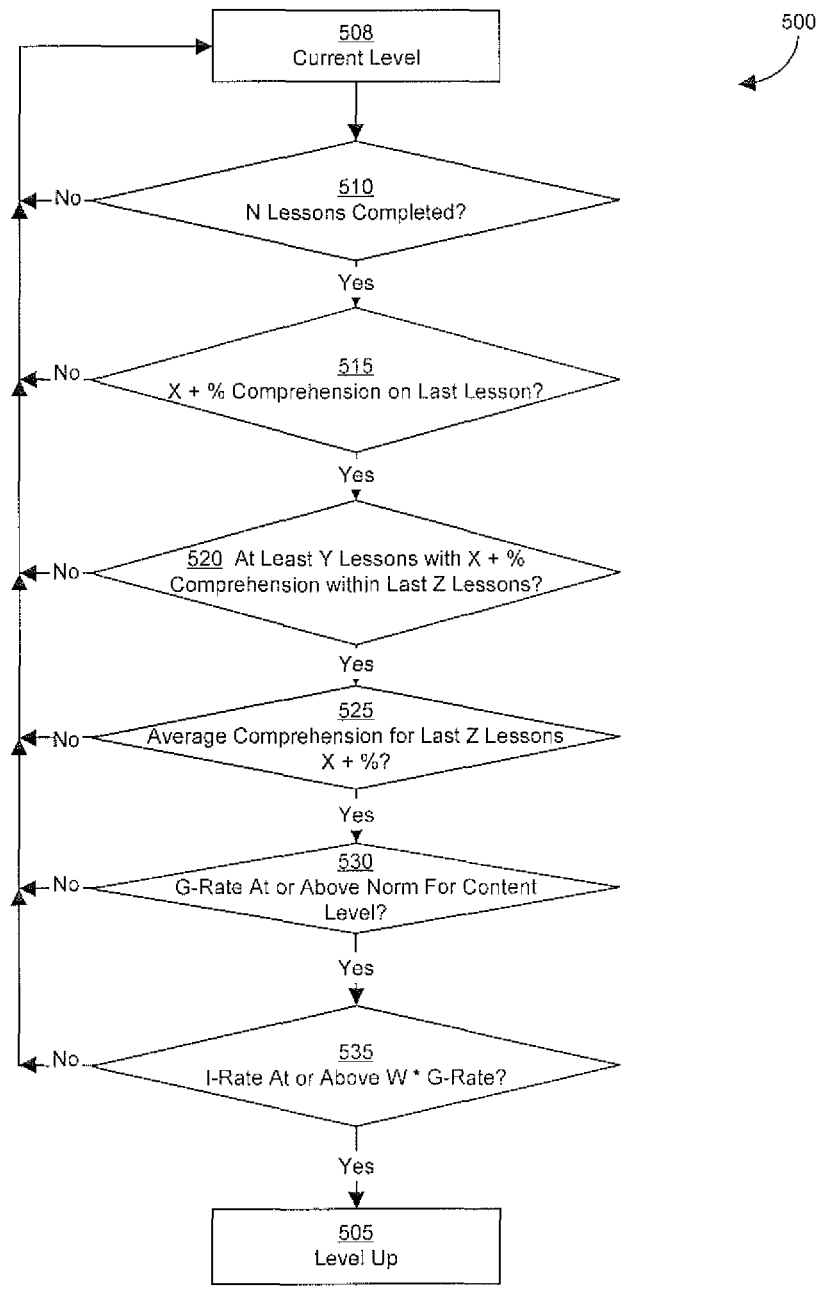
FIG. 5 is a flow diagram illustrating an example decision-making process for deciding whether or not to increase the content level of the reading lessons presented to a user in the guided reading component of FIG. 2.

At its broadest, the level-up logic used by system 200 to determine whether or not a user's performance merits increasing the user's current content level may be any that is suitable under the circumstances. That said, FIG. 5 illustrates (merely as an example) a multi-step level-up decision making process 500 that requires the user's performance to meet multiple requirements before leveling-up the content level at step 505 from the current level, represented by block 508 in FIG. 5. At a high level, the decision making in this example is based on the number of lessons completed at the current level 508, the user's performance on the most recent lesson completed, the user's performance on each of a plurality of recently-completed lessons, the user's average performance over a number of recently-completed lessons, the user's single line reading rate ("G-rate") and the user's multi-line reading rate ("I-rate"). More particularly, the decision-making in this example proceeds as follows.

At step 510 system 200 (FIG. 2) determines whether the user has completed a certain number N of lessons at the current content level, for example, 5 lessons. If not, system 200 stays at the current content level and structured silent reading component 212 (FIG. 2) presents another lesson. If the user has completed the requisite number of lessons, system 200 next determines at step 515 whether the user has scored at least X in comprehension on the most recent lesson, where X is any suitable value, such as 70% to 100%, for example. If the user has not scored at least X in comprehension, system 200 stays at the current content level and structured silent reading component 212 presents another lesson. If the user has achieved at least X in comprehension at step 515, process 500 proceeds to step 520 at which system 200 determines whether the user has achieved at least X in comprehension on Y out of the last Z lessons. If not, system 200 stays at the current content level and structured silent reading component 212 (FIG. 2) presents another lesson. However, if the user has achieved at least X in comprehension on Y out of the last Z lessons, then process 500 proceeds to step 525 at which system 200 determines whether the user's average comprehension on the last Z lessons was at least X, where X may be a percentage, such as 70% through 100%, for example.

If the user's average comprehension is not at least X at step 525, system 200 stays at the current content level, and structured silent reading component 212 (FIG. 2) presents another lesson. If at step 525 system 200 determines that the user's average comprehension meets the requirement, process 500 advances to step 530 at which the system determines if the user's G-rate or single line reading rate is at or above the Target for the current content level. If not, system 200 stays at the current content level and structured silent reading component 212 (FIG. 2) presents another lesson. If so, process 500 moves to step 535 at which the system determines if the user's I-rate or multi-line reading rate is at or above W times the user's G-rate for the current content level, wherein W is a weight (e.g., 0.8). If the user's performance does not meet the requirement at step 535, system 200 stays at the current content level and structured silent reading component 212 (FIG. 2) presents another lesson. However, if the user's performance meets the requirement at step 535, as well as at each of steps 510, 515, 520, 525 and 530, system 200 levels-up the user to the next content level and structured silent reading component 212 begins presenting lessons at the raised level.

It is noted that differing criteria can be used for differing levels of user performance. For example, one set of criteria may be used if the current content level is below the user's school grade level and another set of criteria may be used if the current content level is at or above the user's school grade level. A similar adjustment of criteria may be employed based on the learning capabilities of various students (i.e. special education versus gifted or English as a Second Language student). Those skilled in the art will readily appreciate that while FIG. 5 illustrates a six-step decision-making process for determining whether or not system 200 should level-up a user, other systems can use other criteria and more or fewer decision-making steps, as appropriate for the desired scheme. It is further noted that the leveling-up logic used can be modified as necessary to have additional logic for leveling-up content level more than one grade level, for example, if the user is achieving 100% proficiency on the current content level. This can be used in conjunction with leveling-down logic (see below) that drops a user's content level based on various logic that shows the user's proficiency is at a certain level below the standards for the current level's content.

In a specific example of leveling-up logic, structured silent reading component 212 is configured so that system 200 may automatically level-up (prior to completing all lessons 216, 220, 224 on a given readability content level) only if they are working within two-segment, multi-line/single-line presentation format lessons. To automatically level-up when the user's current level within guided reading component 212 system 200 requires that the following goals be met:
- the user has met their target G-rate (single line reading rate) for the current content level;
- the user has met their target I-rate (multi-line reading rate) on the most recent lesson (at least 65-95% of G-rate goal);
- the user has met the comprehension goal on the most recent lesson (comprehension goals may vary depending on a student's current content level in relation to their grade level)
- the user has met the average comprehension goal over a predetermined number of lessons (comprehension goals may vary depending on a student's current content level in relation to their grade level)

In this example, it is noted that if an administrator, such as a teacher, overrides the automated features of structured silent reading component 212 and chooses a presentation format that does not allow for independent reading, the level-up logic does not require independent rate goals to be met.

Content Leveling-Down

In an example implementation, the silent reading fluency system may lower the user's initial content level based on average comprehension scores on initial reading lessons. For example, if a student is unable to achieve 70%+ comprehension within the first 5-6 lessons in guided reading component 212, system 200 automatically lowers the content level one level.

Exemplary Hardware

Figure 6:
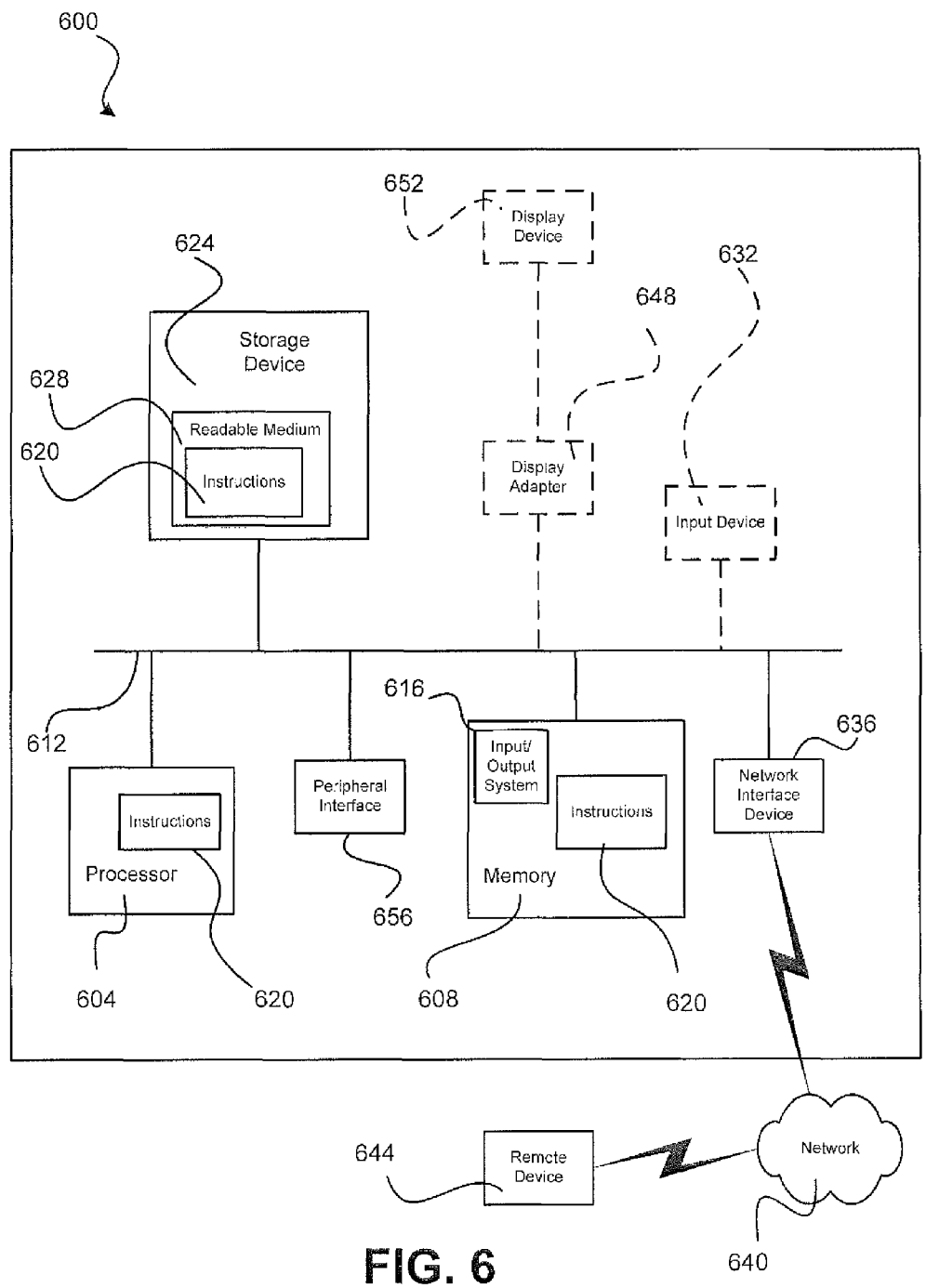
FIG. 6 is a high-level schematic diagram illustrating a computing device representative of computing devices that could be used for implementing any one or more of the methods and systems of the present disclosure.

FIG. 6 shows a diagrammatic representation of one embodiment of a computing device in the exemplary form of a computer system 600 within which a set of instructions for causing the device to perform any one or more of the aspects and/or methodologies of the present disclosure may be executed. Computer system 600 includes a processor 604 (e.g., a microprocessor) (more than one may be provided) and a memory 608 that communicate with each other, and with other components, via a bus 612. Bus 612 may include any of several types of bus structures including, but not limited to, a memory bus, a memory controller, a peripheral bus, a local bus, and any combination thereof, using any of a variety of bus architectures well known in the art.

Memory 608 may include various components including, but not limited to, a random access read/write memory component (e.g., a static RAM (SRAM), a dynamic RAM (DRAM), etc.), a read-only component, and any combination thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of instruction sets including, but not limited to, an operating system, one or more application programs, other program modules, program data, and any combination thereof.

Computer system 600 may also include one or more storage devices 624. Examples of storage devices suitable for use as any one of the storage devices 624 include, but are not limited to, a hard disk drive device that reads from and/or writes to a hard disk, a magnetic disk drive device that reads from and/or writes to a removable magnetic disk, an optical disk drive device that reads from and/or writes to an optical media (e.g., a CD, a DVD, etc.), a solid-state memory device, and any combination thereof. Each storage device 624 may be connected to bus 612 by an appropriate interface (not shown). Example interfaces include, but are not limited to, Small Computer Systems Interface (SCSI), advanced technology attachment (ATA), serial ATA, universal serial bus (USB), IEEE 13144 (FIREWIRE), and any combination thereof. In one example, storage device 624 may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data and/or data storage for computer system 600. In one example, instructions 620 may reside, completely or partially, within machine-readable medium 628. In another example, instructions 620 may reside, completely or partially, within processor 604.

In some embodiments, such as a general purpose computer, computer system 600 may also include one or more input devices 632. In one example, a user of computer system 600 may enter commands and/or other information into the computer system via one or more of the input devices 632. Examples of input devices that can be used as any one of input devices 632 include, but are not limited to, an alpha-numeric input device (e.g., a keyboard), a pointing device, a joystick, an audio input device (e.g., a microphone, a voice response system, etc.), a cursor control device (e.g., a mouse), a touchpad, an optical scanner, a video capture device (e.g., a still camera, a video camera), touchscreen, a digitizer pad, and any combination thereof. Each input device 632 may be interfaced to bus 612 via any of a variety of interfaces (not shown) including, but not limited to, a serial interface, a parallel interface, a game port, a Universal Serial Bus (USB) interface, a FIREWIRE interface, a direct interface to the bus, a wireless interface (e.g., a Bluetooth® connection) and any combination thereof.

Commands and/or other information may be input to computer system 600 via storage device 624 (e.g., a removable disk drive, a flash drive, etc.) and/or one or more network interface devices 636. A network interface device, such as network interface device 636, may be utilized for connecting computer system 600 to one or more of a variety of networks, such as network 640, and one or more remote devices 644 connected thereto. Examples of a network interface device include, but are not limited to, a network interface card, a modem, a wireless transceiver (e.g., a Bluetooth® transceiver) and any combination thereof. Examples of a network include, but are not limited to, a wide area network (e.g., the Internet, an enterprise network), a local area network (e.g., a network associated with an office, a building, a campus, a group of wireless sensors or other group of data streaming devices, or other relatively small geographic space), a telephone network, a direct connection between two computing devices, and any combination thereof. A network, such as network 640, may employ a wired and/or a wireless mode of communication. In general, any network topology may be used. Information (e.g., data, instructions 620, etc.) may be communicated to and/or from computer system 600 via the one or more network interface devices 636.

In some embodiments, such as a general purpose computer, computer system 600 may further include a video display adapter 648 for communicating a displayable image to a display device, such as display device 652. Examples of a display device include, but are not limited to, a liquid crystal display (LCD), a cathode ray tube (CRT), a plasma display, and any combination thereof. In addition to a display device, a computer system 600 may include one or more other peripheral output devices including, but not limited to, an audio speaker, a printer, and any combination thereof. Such peripheral output devices may be connected to bus 612 via a peripheral interface 656. Examples of a peripheral interface include, but are not limited to, a serial port, a USB connection, a FIREWIRE connection, a parallel connection, and any combination thereof.

A digitizer (not shown) and an accompanying pen/stylus, if needed, may be included in order to digitally capture freehand input. A pen digitizer may be separately configured or coextensive with a display area of display device 652. Accordingly, a digitizer may be integrated with display device 652, or may exist as a separate device overlaying or otherwise appended to the display device.

Examples of Structured Silent Reading Methods

The following FIGS. 7-13 illustrate various structured silent reading methods that implement broad concepts of the present disclosure. As will be seen, these example methods can be related to method 100 of FIG. 1 and system 200 of FIG. 2. However, the presentation of the methods of FIGS. 7-13 has a different presentation and describes concepts disclosed in connection with FIGS. 1-5, above, in further detail and from a different perspective. Skilled artisans will recognize the relation of the method of FIGS. 7-13 to method 100 and system 200 of FIGS. 1-5.

Figure 7:
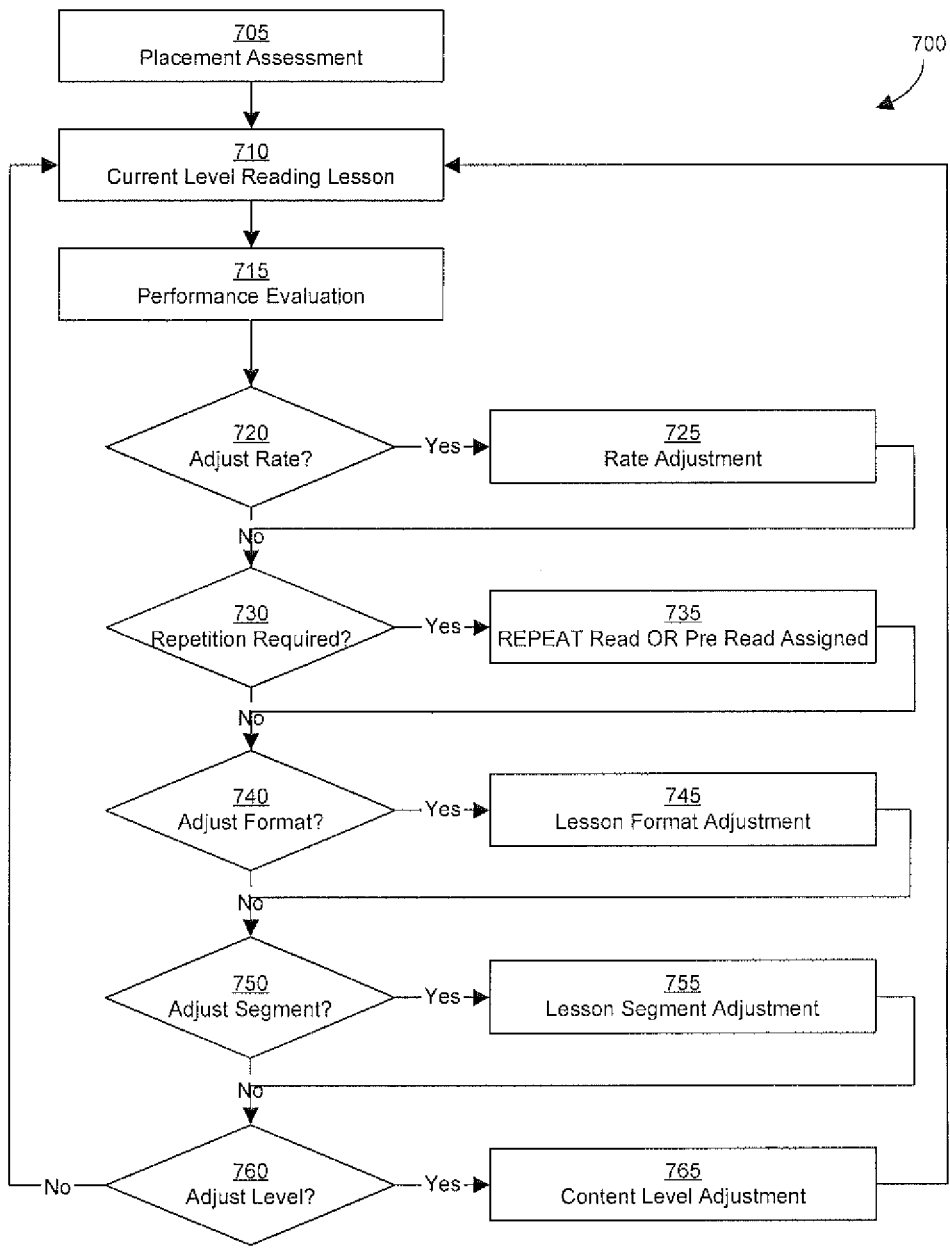
FIG. 7 is a flow diagram of a structured silent reading fluency training method.

Referring now to the drawings, FIG. 7 illustrates at a high level a structured silent reading fluency training method 700 that embodies broad concepts of the present invention. As will be appreciated, the various steps of method 700 can be readily implemented in computer software that is executable in any suitable computing environment, such as a standalone computing environment (e.g., on a desktop computer or laptop computer) and a computer network environment (e.g., a local area network, such as server/client network within a school, and a wide area network, such as the Internet), among others. An example of hardware that can be used to implement a reading fluency training method that utilizes broad concepts of the present disclosure, such as method 700, is described below in connection with FIG. 6. First, however, details of method 700 and other concepts of the present invention will be presented since, as those skilled in the art will readily appreciate, the implementation of these concepts in a particular computing environment would simply be a matter of choice, with skilled artisans being able to adapt the novel concepts of the present disclosure to the desired environment using routine programming practices and skills.

Figure 8:
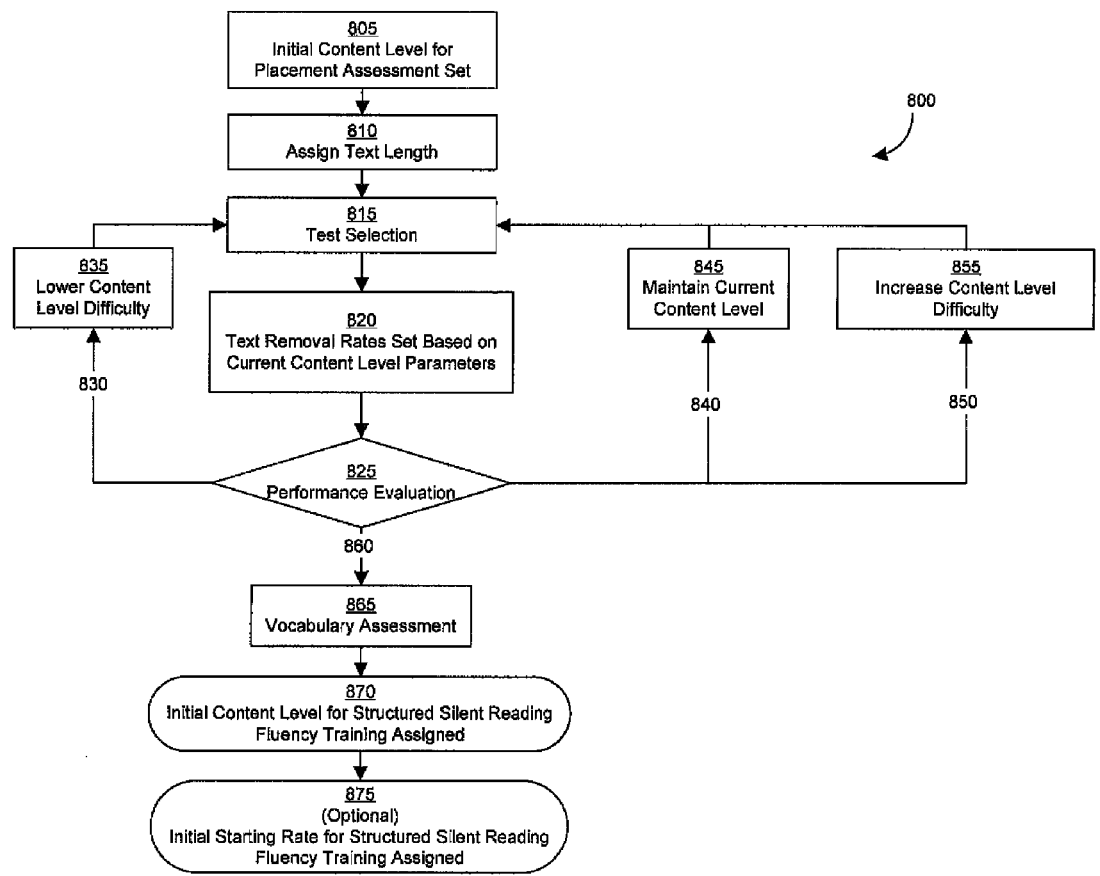
FIG. 8 is a flow diagram of silent reading fluency assessment method.

Reading fluency training method 700 begins at step 705 with a reading placement assessment. As described below in FIG. 8 in more detail, in this example the reading placement assessment can use a set of reading selections to automatedly assign the user to an appropriate content level with respect to the content readability and reading rate (as represented in FIG. 8; steps 870 and 875). In one example, varied content levels can correspond directly to school grade level norm reading rates, such as appears in Table I, above. It is noted that reading placement selections are typically, though not necessarily, more abbreviated than reading lessons presented in connection with other steps of method 700. This will be addressed in more detail below in connection with the example of FIG. 8. In conjunction with this content-level assignment, the reading placement assessment performed at step 705 may also be used to automatedly assign an initial reading rate value corresponding to the automatedly assigned content level of the user at issue. That said, in certain implementations of method 700, this initial reading rate value may be adjusted as a result of following steps, i.e., FIG. 10 step 1010, wherein method 1000 uses structured reading calibration activities to identify and confirm the initial reading rate.

Referring to FIG. 8, method 800 determines each student's initial placement level in method 700. In this example, method 800 of FIG. 8 employs a unique method of automatedly assessing the user's reading proficiency. A purpose of an automated silent reading placement assessment is to assign to each user the proper independent level of instructional content in relation to both the reading level of the content and the reading rate norms required to read this content at acceptable rates with adequate and efficient comprehension. Upon setting an appropriate start level for the assessment (step 805), method 800 presents a user with a series of reading selections at various lengths (indicated in FIG. 8 by steps 810 and 815) at various content levels. Each assessment reading selection is progressively deleted from top to bottom at a rate set to be at a particular value slower (e.g., 5% to 40% slower) than a "Norm" rate for the corresponding content level (step 820). It should be noted that in some implementations, student's reading rate performance in combination with comprehension performance on various test selections can determine the rate of removal independent from normative values. Exemplary Norm rates based on research for each content/grade level are provided in Table I, above.

This manner of presenting assessment reading lessons (step 820) places a time constraint on the user to both read and comprehend. This technique encourages maximum attention by the user, as well as measures the degree of fluency or efficiency with which a user can read content. If the user cannot keep up with the disappearing text (i.e., cannot read the displayed text before it vanishes), they will not be able to answer the questions that follow each reading. A user who cannot maintain a minimum degree of fluency (e.g., a percentage, such as 5% to 40%, below the Norm rate for a given content level) is not proficient enough to start their practice at that level. The decision making for adjusting the content level and removal rate parameters for each successive test selection presented within method 800 may involve the evaluation of both reading rate and comprehension on previously completed test selections. Depending on a user's performance evaluation (step 825), the content level difficulty of the next test selection (step 815) may be adjusted. If a user's performance fails to meet predetermined minimum requirements (arrow 830) the content level difficulty may be lowered for the next test selection (step 835). In some cases particular user performance may suggest an additional exposure to the same content level difficulty as depicted by arrow 840 and step 845. Above average performance may call for a content level difficulty increase as depicted by arrow 850 and step 855. The appropriate assigned starting level (step 870) at which a user can read with good comprehension at a qualifying rate can also be adjusted by the student's performance on a vocabulary assessment (step 860) that typically follows the completion of short and long test selections presented within the assessment. System 800 determines the starting practice level of content users will encounter in a structured reading component (steps 710-765 within method 700; FIG. 7), which is described immediately below.

Following step 710 in FIG. 7, the user is presented with a series of structured reading lessons selected based on content level assigned at step 705. Each reading lesson presented at step 710 typically includes a content-level-appropriate reading and one or more groups of questions, such as multiple-choice questions, for the user to answer about the reading. Students' reading rates are captured and recorded along with comprehension performance. Readings suitable for use as a reading in the context of the present disclosure are well-known in the art, especially in the field of reading comprehension testing. Therefore, details of suitable readings need not be disclosed in any detail herein for those skilled in the art to understand and implement the broad concepts of the present disclosure.

As highlighted in FIG. 7, in addition to content-level-appropriateness, each reading lesson can have any of a variety of structured reading rate parameters appropriate for each student (step 720), repetition (step 730), presentation formats (step 740) appropriate for a student's current ability level, and appropriate segmentation of the lesson text in order to control the duration of attention required for a student to read each segment (step 750). At step 715, the user's answers to the questions accompanying each structured reading lesson are evaluated and data is collected on the user's performance on those questions along with corresponding reading rate performances. After a predetermined number (one or more) of reading lessons are presented at step 710, at step 715 the user's performance is assessed against certain established criteria that method 700 uses to determine any one or more of the following: 1) whether to adjust reading rate values as presented at step 720; 2) whether a user-assisting repetition is necessary as presented at step 730; 3) whether to adjust the lesson format as presented at step 740; 4) whether to adjust the segmentation of text as presented at step 750 and 5) whether to adjust the content level of the reading lesson(s) presented at step 760. Relative to the example performance measures mentioned above, when each of those measurements are compared to a corresponding established threshold measurement at step 715 so as to determine whether or not the user's performance meets the established requirement. More than one performance measure can be used for the automated decision-making of method 700. For example, if the performance measures for a particular implementation includes various performance measures such as the performance on the last reading lesson and the average performance on the last ten reading lessons, method 700 compares the measured values compared to the corresponding respective threshold values. The comparisons may also be operated on logically, for example, using a logic AND, a logic OR or a logic exclusive OR operation. That is, if the criteria is that method 700 will proceed to rate adjustment at step 720 when the comprehension performance on the last structured reading lesson was less than 85% AND the average comprehension performance on the last eight reading lessons was less than 75%, then both criteria would have to be met for the method to assign a repetition lesson session.

Depending on how many structured reading lessons have been completed at the time of a current assessment, the assessment may be based on not only the performance during the most recent iteration, but also on performance during one or more earlier lessons. Examples of performance measures include: number of lessons completed; comprehension performance on the last reading lesson; average performance on a number of most recent reading lessons; reading rate performance on a particular segment of a reading parsed into two or more segments; and performance on a particular type of presentation over a number of prior such segments, among others. Each of these performance measures can be expressed conveniently, but not necessarily, as a single value or percentage. Detailed examples of performance evaluation procedures that can be performed at step 715 are presented with the particular embodiment of FIGS. 7-13.

Figure 9:
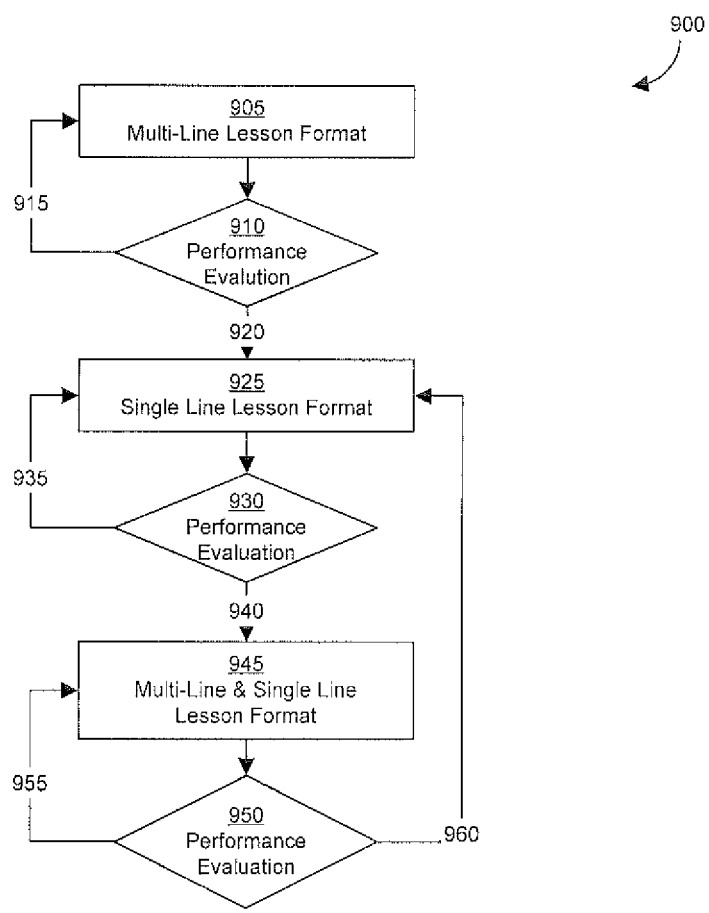
FIG. 9 is a flow diagram of a lesson format component of a structured silent reading fluency training method.
Figure 11:
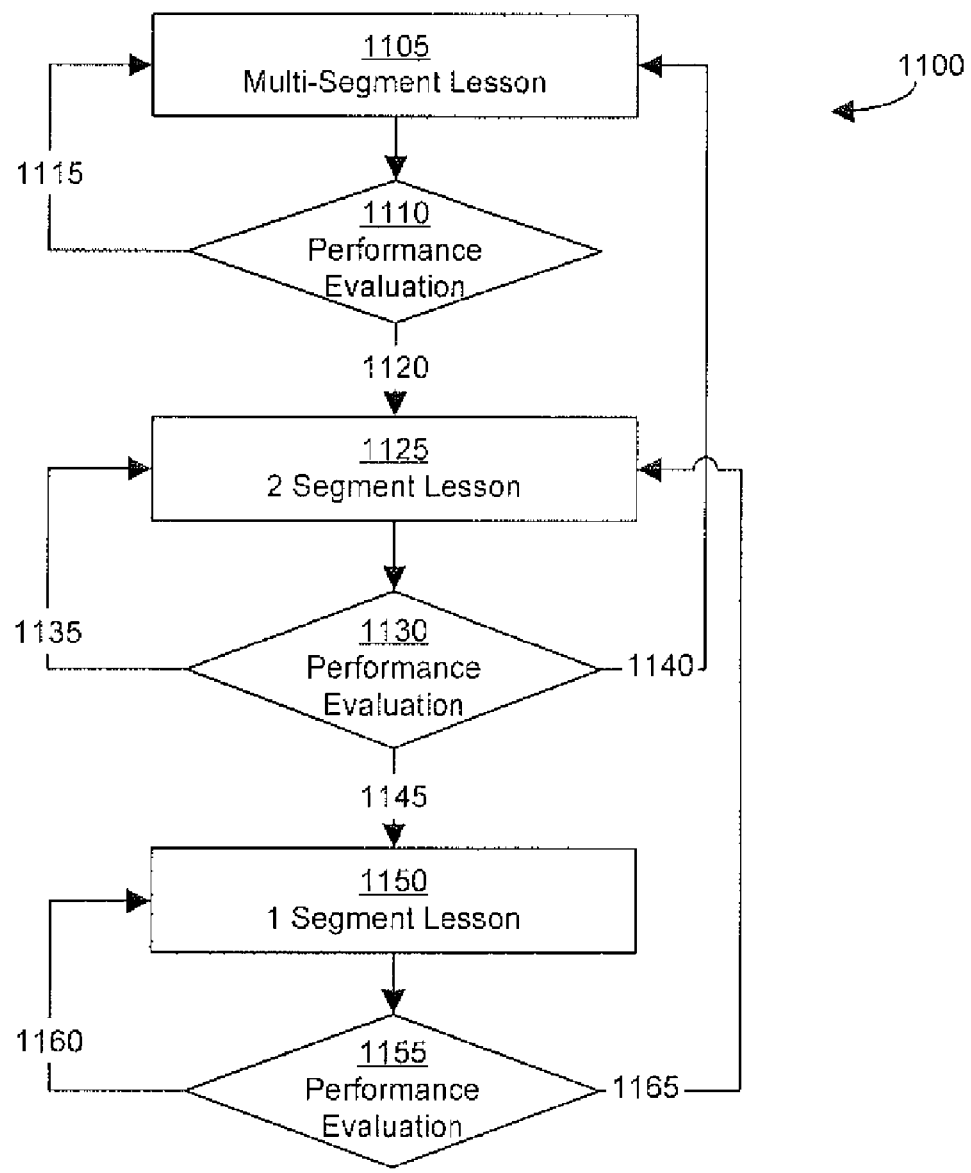
FIG. 11 is a flow diagram illustrating an example of decision-making process for deciding whether or not to adjust the number of segments that the reading lesson text is divided into for a user in the structured silent reading fluency training.

As illustrated in FIG. 9, the lesson presentation formats differ in the manner in which text is presented to the user. The two main variations on the presentation of a reading lesson include: sequentially making visible successive lines of text from the top down at a predetermined rate that determines the maximum rate the text can be read before removing the text from the top down at a slower predetermined rate to determine the minimum rate the text can be read ("multi-line presentation"); presenting lesson text a full line at a time ("single-line presentation") using a moving mask to reveal and conceal words within the line at predetermined rates in order to guide the user across each line of text from left to right. Additional format variations include: presenting lesson text line-by-line using a pacing element to guide the user across the line of text at predetermined rates ("single-line-paced presentation"); presenting lesson text line-by-line without using a pacing element or mask and simply using the replacement of each successive line of text as a basis to present the text at predetermined rates ("single-line-by-line") and presenting a lesson text word-by-word where each successive word replaces the last word within the same location at predetermined rates to eliminate the tracking skills required in typical reading ("word-by-word presentation"). Multi-line presentations provide the user with maximum and minimum rate parameters in which the lesson text can be read, but the user determines their own pace through the text, typically at a rate between the maximum and minimum rates, through the use of an on-screen "Go On" button, or by using the keyboards Spacebar. This allows for greater variation in the rates recorded in multi-line presentation formats as opposed to the single-line presentation formats where the rate is entirely determined by the system. Rates for both multi-line and single-line presentation formats are captured and recorded separately and evaluated in relation to one another at periodic intervals throughout the training in relation to lesson comprehension performance and other performance measures (discussed below) to determine adjustments made to rates within both formats. Maximum and minimum rates used in multi-line presentations are most typically, but not necessarily, based on the current single-line rates the student has encountered while maintaining acceptable comprehension. FIG. 9 depicts an example of format decision making, as could occur within step 140 of FIG. 7, where a user begins reading lesson selections in multi-line presentation format (step 905). Based on a user's performance evaluation (step 910), the current lesson format may be maintained (arrow 915) or the user may transition (arrow 920) to single line lesson presentations (step 925). Similarly based on the user's performance evaluation (step 930), the current lesson format (step 925) may be maintained (arrow 935) or the user may transition (arrow 940) to lessons including both multi-line and single-line presentation formats (step 945). Again, user performance analysis (step 950) will determine whether the user will remain within the same format (arrow 955) or return to single-line presentation again (step 925). The presentation formats selected are adjusted in accord with the lesson text segmentation (see method 1100; FIG. 11 for further details) that has been determined for the user (discussed below).

Figure 10:
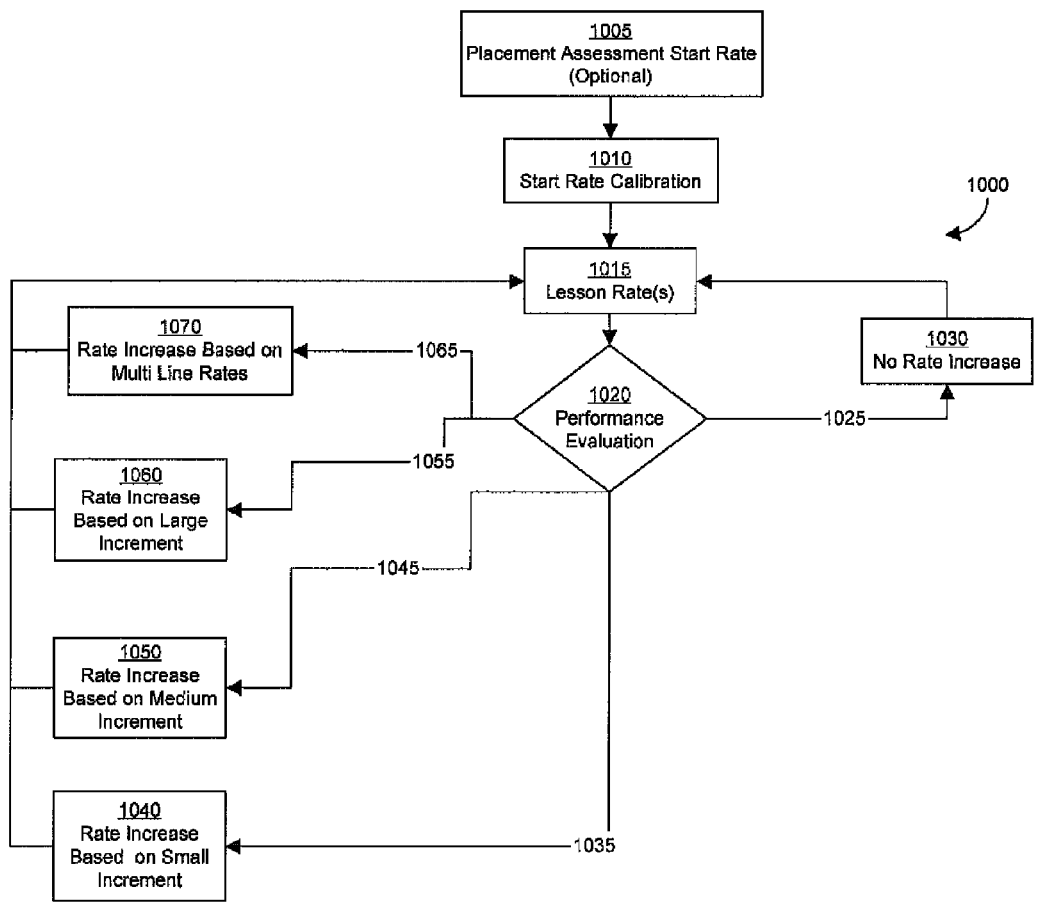
FIG. 10 is a flow diagram illustrating an example of decision-making process for deciding whether or not to increase the reading rate of the reading lessons presented to a user in the structured silent reading fluency training.

FIG. 10 illustrates an example of rate adjustment decision making where one or more performance measures may be used to determine at step 720 whether the multi-line and/or single rate display rate values should be adjusted. If so, system 700 increases any or all rate values at step 725 and then continues to steps 730, 740, 750 and 760 before returning to another structured reading lesson at step 710 using the increased reading rate value. Details regarding one example of decision-making that can be used to determine whether or not to increase the reading rate value is presented below in connection with FIG. 10. Referring to FIG. 10, once a start rate determined by the placement assessment (step 1005) has been validated, or a new start rate established within a series of lessons that calibrates the most effective starting rate for the student (step 1010), the student completed a lesson at this starting rate (step 1015), after which a performance evaluation is conducted (step 1020). The performance evaluation determines whether the no rate increase should be applied (step 1030) or whether the reading rate on the next lesson should be increased. Reading rates are continually assessed relative to comprehension performance on one or more lessons. In this example instantiation in FIG. 10, there are four possible increments of different sizes that can be used to increase the user's multi-line or multi-line and single-line reading rates, based on the performance evaluation (step 1020): small (step 1040), medium (step 1050), large (step 1060) as well as an increment based on the users previous multi-line reading rates (step 1070). The increments sizes for each user vary depending on the current content level of the user and the user's grade level. The determination of which increment should be applied to the next reading lesson is typically based on the grade level of the student, the number of total lessons completed by the student and the students performance relative to performance goals of the current content level. In an example, the increments used to increase a users reading rates may start at the medium increment (step 1050), and after the student was able to complete most lessons out of a number of lessons with good comprehension, the increment may be adjusted to a large (step 1060) increment value. If, however, only an average number of lessons were completed in a satisfactory fashion, but the student was able to achieve an overall comprehension average that was acceptable, the increment might be maintained (step 150), if the student's performance was unsatisfactory the increment used to increase the users reading rate might be changed to the small increment (step 1040). By contrast, if the comprehension performance was satisfactory and the multi-line reading rate was in excess of the rate goals for the current level, the increment used to increase the student's rate on the next lesson might be based on an average of various multi-line reading rates (step 1070). Similarly, if a students comprehension evaluation determines that a student has had difficulty comprehending one or more of the recently completed lessons within a given rate range, the system may sustain or lower the students reading rates until comprehension performance is re-established with assistance from the various structured training method used to improve a students silent reading ability.

Following step 750 in FIG. 7, system 700 determines the number of segments each lesson text is divided into. Each lesson is divided into multiple segments that can be presented to the user segment by segment, or with grouping of segments, so as to vary the overall amount of segments. Many struggling readers cannot sustain attention for longer intervals. Lesson segmentation is thus a method to control the sustained attention required of the student while completing a lesson of a fixed length. The lesson segmentations differ in the manner in which the reading is parsed and presented to the user as well as how the questions are dispersed throughout the reading. Examples of differing reading parsings include: presenting the reading in its entirety and placing all questions at the end of the reading ("single segment parsing"); presenting the reading in two segments, with a first subset of the questions following the first segment and a second subset of the questions following the second segment ("two-segment question parsing"); presenting the reading in two segments, with all questions following the second segment ("two-segment parsing"); and presenting the reading in three or more segments, with a corresponding subset of the questions following each of the segments ("multi-segment parsing", ("multi," as used herein, meaning three or more)). FIG. 11 depicts an example of possible segmentation decision making, as could occur within step 750 of FIG. 7, where the user is first presented lessons with multi-segment parsing 1105, after which a performance evaluation is performed (step 1110) in order to determine whether the student should progress to two-segment parsing (step 1125), after which a similar performance evaluation is performed (step 1130) to determine whether the student should remain (arrow 1135) within the current segment parsing or progress (arrow 1145) to single segment parsing (step 1150). As the student meets the performance evaluation goals the student progresses from reading multiple shorter segments to fewer longer segments. This method for altering the attention required assists struggling readers in developing the necessary attention required to be successful independent readers. Indeed, the present inventors have unexpectedly found that certain lesson segmentation, sequencing of segmentation, presentation formats and presentation rate parameters adjusted together can greatly assist students who have struggled to develop their independent silent reading ability without this structure. Similarly, if the performance evaluations determine that the student is having difficulty with, for example, 2 segment lesson parsing, the performance evaluation following a 2 segment lesson parsing might determine that the student should be moved back (as depicted by arrow 1140) to multi-segment lesson parsing (step 1105). Performance evaluations may include comprehension performance over the course of several lessons in addition to the reading rates captured from the various segments within previous lessons.

At step 730, it is determined whether or not the user's performance meets the established criteria for repetitions. For example, if the user's performance at the current assessment does not meet the established criteria, method 700 proceeds to step 735 wherein one or lesson content repetitions are assigned to the user. Details regarding one example of decision-making that can be used to determine the necessity for a repetition are presented below in connection with FIG. 12.

After a student has completed a new lesson (step 1205 in FIG. 12), predetermined performance goals are assessed at step 1210 in order to determine whether the student should repeat the lesson just completed (step 1220), or complete a new lesson that will presents portions of the new lesson more than once to provide a pre-reading experience (step 1235). For example, such acceptable level for repeat lessons to be assigned may be deemed to be a particular percentage of correct answers, such as below 60% over a predetermined number of lessons. Following the repeat lesson (step 1220) the user returns to another performance analysis (step 1210) which will determine whether the user needs to repeat the lesson again or whether she or he can return to a new lesson (step 1205). Repeat reading lessons may be presented in the multi-segment, single-line or word-by-word formats. Each repeated lesson may be repeated using the same parsing (segmentation) as used in the corresponding lesson, or it may be repeated using a different parsing. In addition, the repeated lesson may be performed at a different presentation rate that may be varied (or not) depending on magnitude of the difference between the user's performance and the established requirement(s). For example, if a particular reading lesson was presented as a multi-line presentation format at a first rate (i.e., the current rate value), the rate of presentation in the single line repeating of that reading lesson during a repetition lesson at step 725 of FIG. 7 may be adjusted to a second rate higher or lower than the first rate. In one example, rates may range from −50% to 50% higher than the current rate, depending, for example, on how low the user's performance was compared to the established requirement(s). When multiple reading lessons are being repeated in the repetition mode at step 735, the rate during the successive repeat or pre read lessons may be changed, or not, depending on the user's performance on the reading lessons during these lessons.

Figure 12:
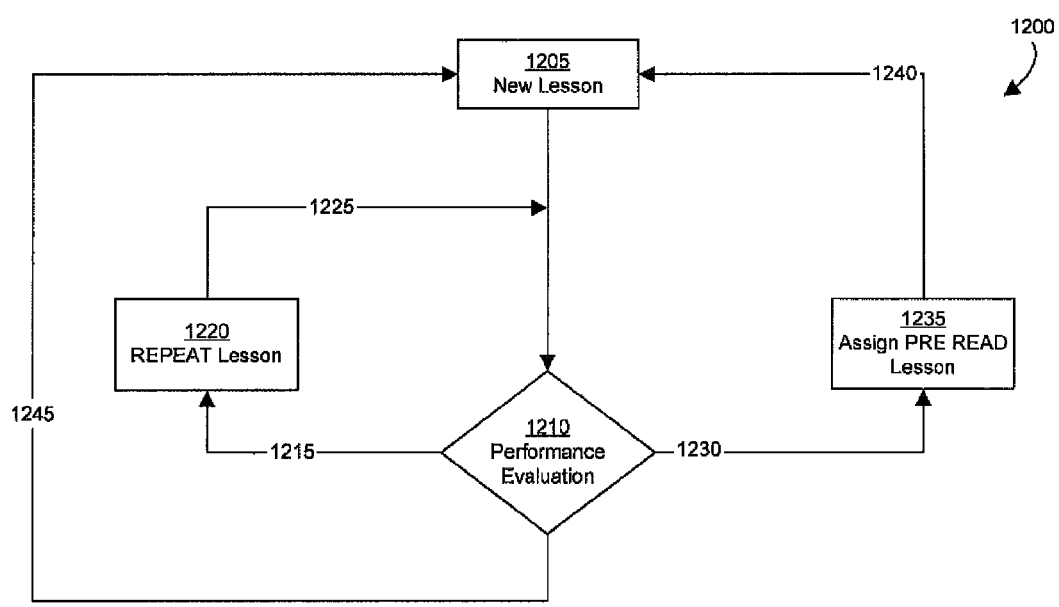
FIG. 12 is a flow diagram illustrating an example of decision-making process for deciding whether or not repeat lessons or lessons containing pre-reading activities should presented to a user in the structured silent reading fluency training.

Another style of reading lesson suitable for a repetition at step 735 is a pre-reading type lesson in which the user is presented all or a portion of the reading from a structured reading lesson without the questions (as assigned in step 1235 of FIG. 12). The user is then permitted to read the reading or portion thereof (i.e., pre-read the lesson) before being presented the same reading in the traditional structured reading format and presentation, which includes one or more questions. During a pre-reading type repetition, the presentation rate can be the same or higher, relative to the current rate value, for example, from 0% to 100% faster rate than the current reading rate value. This change, if any, can be based on the user's performance relative to the predetermined requirement(s) used at steps 715 and 720.

Similarly, one or more performance measure(s) may be used at step 760 to determine whether or not to adjust the content level of the current lesson(s) presented at step 765. If at step 760 the user should be leveled-up, then the current level is increased at step 765 before method 700 proceeds back to step 710 for presentation of one or more structured reading lessons on this new content level. If, on the other hand, it is determined at step 760 that the content level does not need to be lowered or increased, then method 700 may proceed back to step 710 for the presentation of one or more structured reading lessons on the same content level that existed prior to the performance assessment at step 760.

If at step 760 in FIG. 7 it is determined that the content level should be adjusted, method 700 may proceed to step 765 where the current content level is lowered or increased one or more content levels, depending on how much the user's performance in relation to pre-determined criteria thresholds. In an example implementation 1300 a user may work on a given content level (step 1305). Various check points such as: comprehension goals met for the level (step 1310), number of completed lessons on the level (step 1315), multi-line rate goals met for the level (step 1320) and single-line rate goals met for the level (step 1325), will have to be consulted in order to determine whether a user's content level should be increased (step 1330). Criteria for leveling up will vary for different users based on their grade level and the current content level they are assigned to. All of the various criteria within each step would need to be met to qualify for a level increase. For example, a 4th grade student working on content level 3 might have to achieve a comprehension goal of 80% on the last 12 lessons, have completed at least 15 lessons, achieved a multi-line rate of at least 200 wpm and a single-line rate of at least 215 wpm in order to advance to content level 4. Depending on the structuring of the performance measures and use of the pre-established requirements, provisions could be made in various embodiments for leveling-up more than a single level at a time. For example, if the pre-established criteria is a two-tiered criteria, leveling-up a single level could occur when the performance measures fall within a specified range and leveling up two levels could occur if the user's performance exceeded that range. Those skilled in the art will readily appreciate that other leveling-up schemes are possible.

Figure 13:
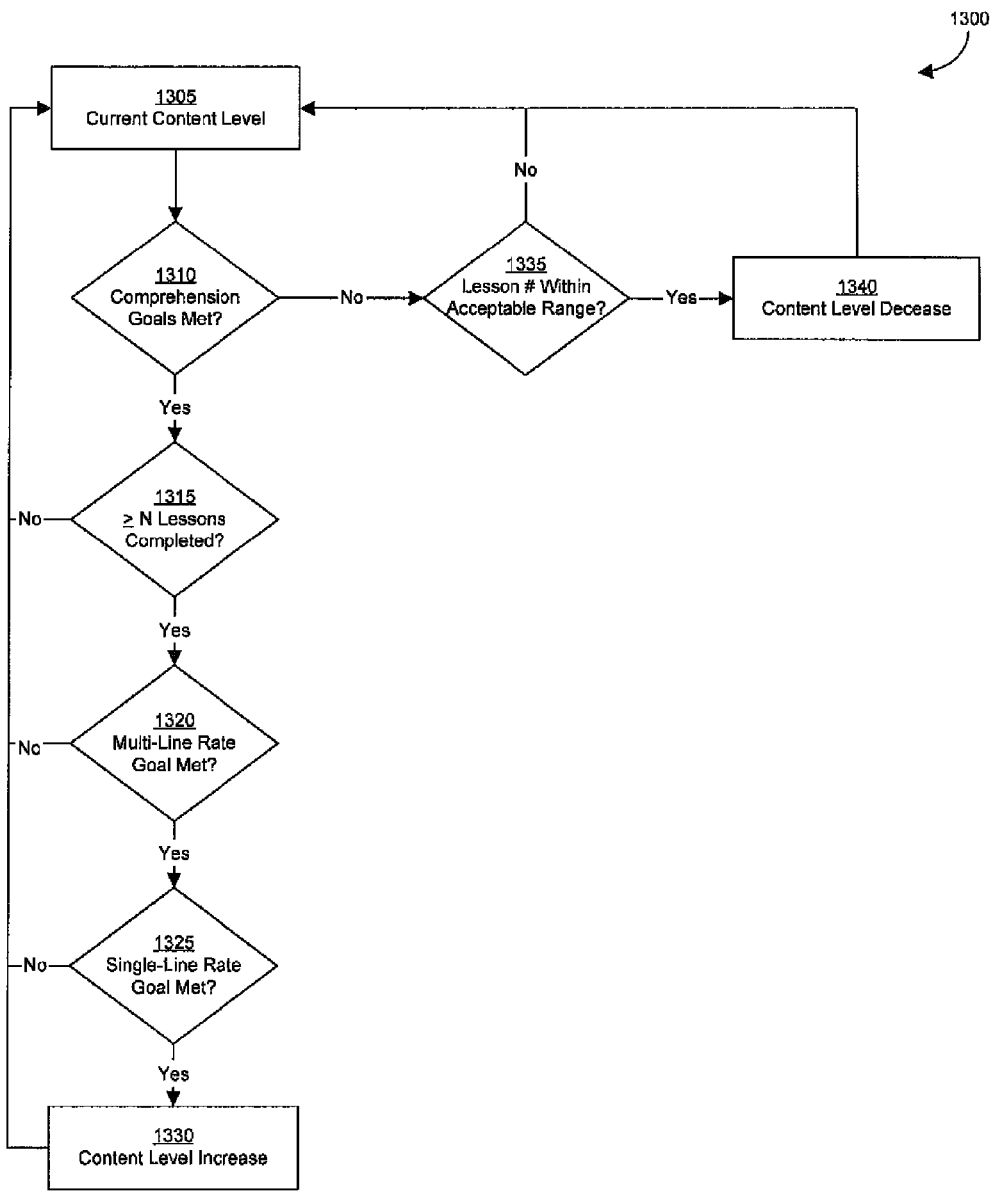
FIG. 13 is a flow diagram illustrating an example decision-making process for deciding whether or not to adjust the content level of the user in the structured silent reading fluency training.

The decision-making for leveling down can be the similar to leveling-up, albeit opposite in nature as depicted in example 1300 within FIG. 13. Comprehension goals for the level are first assessed at step 1310. If the student has not reached the comprehension goals, the number of lessons completed within the level can be assessed (step 1335) to determine whether the student has completed an amount of lessons at which point they should have achieved these goals. If they have not achieved the comprehension goals within the specified number of lessons, determined by their grade level and the current content level on which they are working, the system may decrease the content level difficulty at step 1340, before returning the user to complete another lesson (step 1305) at this lowered content level. It should be noted that content level decreases may only be made for a certain interval of training time, after which point the student is considered to be well placed on a content level that will best assist the user in developing silent reading fluency.

Not explicitly reflected in the flowchart of FIG. 7, but which should be apparent to a skilled artisan, is the fact that method 700 can continue until the user has achieved a certain level of performance relative to grade level. In addition, as those skilled in the software arts can appreciate, a software implementation of method 700 can include various features for allowing a user to leave and return to method 700 so that the training received by the user can be extended over multiple user-sessions that may continue, for example, over multiple days, months or even years. For example, a student may progress through lessons over several days during a week, complete a portion of the training during a month or two and then resume training at a later date or a student may need to continue with the training program during a subsequent year.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of performing reading fluency training via a computer having a visual display and a user interface, comprising:

presenting to a user, on the visual display, structured reading lessons of multiple formats including a multi-line reading format and a single-line reading format, wherein each of the structured reading lessons includes a set of reading-comprehension questions;

capturing, by the computer, reading rate data for segments of the structured reading lessons presented in multi-line reading format and for segments of the structured reading lessons presented in single-line reading format;

collecting, via the user interface, answers to each set of reading-comprehension questions provided by the user;

using the answers to each set of reading comprehension questions to obtain at least one reading comprehension measure;

continually assessing, via the computer, reading proficiency of the user as a function of the at least one reading comprehension measure and the reading rate data; and dynamically controlling selection of reading lesson presentation format from among the multiple formats based on, at differing times, one, the other, or both, of the reading rate data and the at least one reading comprehension measure;

wherein said presenting of the structure reading lessons of multiple formats includes:

automatedly varying segmentation of ones of the structured reading lessons in a manner that tends to sustain attention by the user based on the at least one reading comprehension measure; and varying the structured reading lessons between a first format having a first number of text segments and reading comprehension questions interspersed among the first number of text segments and a second format having a second number of text segments and reading comprehension questions following only the second number of text segments; wherein the second number is different from the first number.

2. A method according to claim 1, wherein said presenting of the structured reading lessons includes presenting ones of the structured reading lessons at a first content level, the method further comprising dynamically controlling presentation of the reading lessons by changing the first content level to a second level different from the first content level based on the reading rate data and the at least one reading comprehension measure.

3. A method according to claim 2, wherein the at least one reading comprehension measure includes reading proficiency on at least the most recent one of the structured reading lessons and average reading proficiency over a certain number of most recent ones of the structured reading lessons.

4. A method according to claim 2, wherein the at least one reading comprehension measure includes a multi-line reading rate measure based on proficiency by the user on at least a most recent one of the structured reading lessons.

5. A method according to claim 2, wherein the at least one reading comprehension measure includes a single-line reading rate measure based on proficiency by the user on at least a most recent one of the structured reading lessons.

6. A method according to claim 2, wherein said continual assessing of the reading proficiency includes comparing the reading proficiency to at least one performance parameter that is a function of grade and content level.

7. A method according to claim 1, wherein said presenting of the structured reading lessons includes presenting ones of the structured reading lessons at a first reading rate, the method further comprising dynamically controlling the presentation of the structured reading lessons by changing the first reading rate to a second reading rate different from the first reading rate as a function of the reading rate data and the at least one reading comprehension measure.

8. A method according to claim 7, wherein said changing of the first reading rate to a second reading rate includes incrementing said first reading rate by a predetermined increment, the method further including selecting the predetermined increment from a plurality of predetermined differing increments as a function of the reading rate data and the at least one reading comprehension measure.

9. A method according to claim 1, wherein:

said presenting of the structured reading lessons includes presenting at a multi-line reading rate segments of the structured reading lessons having the multi-line reading format and presenting at a single line reading rate segments of the structured reading lessons having the single-line reading format;

said capturing of the reading rate data including capturing single-line reading rate data using the single-line reading rate segments and multi-line reading rate data using the multi-line reading rate segments; and said continual assessing of the reading proficiency including continually comparing the single-line reading rate data and multi-line reading rate data with one another.

10. A method according to claim 1, wherein said presenting of structured reading lessons includes presenting at least one multi-line segment of at least one reading lesson by incremental buildup of text on the display from top to bottom of a presentation window at a first rate equal to or greater than a second rate at which the user has demonstrated satisfactory comprehension as determined by said continual assessing.

11. A method according to claim 10, wherein said presenting of at least one multi-line segment further includes removal of text from the presentation window at a third rate less than the first rate as a function of the at least one reading comprehension measure and the reading rate data.

12. A method according to claim 1, wherein said presenting of the structured reading lessons of multiple formats further includes automatedly varying placement of reading-comprehension questions throughout the segmentation of ones of the structured reading lessons.

13. A method according to claim 1, further comprising dynamically controlling the presentation of the structured reading lessons by assigning pre-reading activities to the user as a function of the at least one reading comprehension measure and the reading rate data.

14. A method according to claim 13, wherein the user has a current reading rate and the method further includes presenting the pre-reading activities to the user at a reading rate that exceeds the current reading rate as a function of the at least one reading comprehension measure and the reading rate data.

15. A method according to claim 14, wherein said assigning of the pre-reading activities includes varying the pre-reading activities between a word-by-word format and a single-line format as a function of the at least one reading comprehension measure and the reading rate data.

16. A method according to claim 1, further comprising dynamically controlling the presentation of the structured reading lessons by assigning a repeat reading to the user as a function of the at least one reading comprehension measure and the reading rate data, wherein:

the repeat reading is a repeat of one of the structured reading lessons already presented; and the one of the structured reading lessons already presented was presented in a first format and said dynamic controlling of the presentation includes presenting the repeat reading in a second format different from the first format.

17. A method according to claim 16, wherein the one of the structured reading lessons already presented was presented with a first number of questions and said dynamic controlling of the presentation includes presenting the repeat reading with a second number of questions different from the first number of questions.

18. A method according to claim 1, further comprising:
presenting to the user, on the display, a plurality of non-paced reading lessons;
collecting, via the computer, reading comprehension data and reading rate data regarding the plurality of non-paced reading lessons from the user; and
automatedly determining an initial reading rate based on the reading comprehension data and the reading rate data regarding the plurality of non-paced reading lessons.

19. A method according to claim 1, further comprising:
collecting, via the computer, multi-line reading rate data using ones of the structured reading lessons containing the multi-line reading format;
collecting, via the computer, single-line reading rate data using ones of the structured reading lessons containing the single-line reading format; and
determining a current single-line reading rate as a function of the multi-line reading rate data, the single-line reading rate data and the comprehension of the user as measured by a plurality of sets of reading-comprehension questions.

20. A method according to claim 19, wherein said determining of the current single-line reading rate includes raising the current single-line reading rate by an increased increment only when the multi-line reading rate data is quantitatively better than the single-line reading rate data.

21. A computer-readable non-transitory hardware storage medium containing computer-executable instructions for implementing a method of performing reading fluency training via a computer having a visual display and a user interface, said computer-executable instructions comprising:
a first set of computer-executable instructions for presenting to a user, on the visual display, structured reading lessons of multiple formats including an multi-line reading format and a single-line reading format, wherein each of the structured reading lessons includes a set of reading-comprehension questions;
a second set of computer-executable instructions for capturing, by the computer, reading rate data for segments of the structured reading lessons presented in multi-line reading format and for segments of the structured reading lessons presented in single-line reading format;
a third set of computer-executable instructions for collecting, via the user interface, answers to each set of reading-comprehension questions provided by the user;
a fourth set of computer-executable instructions for using the answers to each set of reading comprehension questions to obtain at least one reading comprehension measure;
a fifth set of computer-executable instructions for continually assessing, via the computer, reading proficiency of the user as a function of the at least one reading comprehension measure and the reading rate data; and
a sixth set of computer-executable instructions for dynamically controlling selection of reading lesson presentation format from among the multiple formats based on, at differing times, one, the other, or both, of the reading rate data and the at least one reading comprehension measure;
wherein said first set of computer-executable instructions includes:
computer-executable instructions for automatedly varying lengths segmentation of ones of the structured reading lessons in a manner that tends to sustain attention by the user based on the at least one reading comprehension measure; and
computer-executable instructions for varying the structured reading lessons between a first format having a first number of text segments and reading comprehension questions interspersed among the first number of text segments and a second format having a second number of text segments and reading comprehension questions following only the second number of text segments, wherein the second number is different from the first number.

22. A computer-readable non-transitory hardware storage medium according to claim 21, wherein said first set of computer-executable instructions includes computer-executable instructions for presenting ones of the structured reading lessons at a first content level, the computer-readable hardware storage medium further containing computer-executable instructions for changing the first content level to a second level different from the first content level based on the reading rate data and the at least one reading comprehension measure.

23. A computer-readable non-transitory hardware storage medium according to claim 22, wherein the at least one reading comprehension measure includes reading proficiency on at least the most recent one of the structured reading lessons and average reading proficiency over a certain number of most recent ones of the structured reading lessons.

24. A computer-readable non-transitory hardware storage medium according to claim 22, wherein the at least one reading comprehension measure includes a multi-line reading rate measure, the computer-readable hardware storage medium further containing computer-executable instructions for calculating the multi-line reading rate measure based on proficiency by the user on at least a most recent one of the structured reading lessons.

25. A computer-readable non-transitory hardware storage medium according to claim 22, wherein the at least one reading comprehension measure includes a single-line reading rate measure, the computer-readable hardware storage medium further containing computer-executable instructions for calculating the multi-line reading rate measure based on proficiency by the user on at least a most recent one of the structured reading lessons.

26. A computer-readable non-transitory hardware storage medium according to claim 22, wherein said fifth set of computer-executable instructions includes computer-executable instructions for comparing the reading proficiency to at least one performance parameter that is a function of grade and content level.

27. A computer-readable non-transitory hardware storage medium according to claim 21, wherein said first set of computer-executable instructions includes computer-executable instructions for presenting ones of the structured reading lessons at a first reading rate, the computer-readable hardware storage medium further containing computer-executable instructions for changing the first reading rate to a second reading rate different from the first reading rate as a function of the reading rate data and the at least one reading comprehension measure.

28. A computer-readable non-transitory hardware storage medium according to claim 27, wherein said computer-executable instructions for changing of the first reading rate to a second reading rate includes computer-executable instructions for incrementing said first reading rate by a predetermined increment, the computer-readable hardware storage medium further containing computer-executable instructions for selecting the predetermined increment from a plurality of predetermined differing increments as a function of the reading rate data and the at least one reading comprehension measure.

29. A computer-readable non-transitory hardware storage medium according to claim 21, wherein:
said first set of computer-executable instructions includes computer-executable instructions for presenting at a multi-line reading rate segments of the structured reading lessons having the multi-line reading format and presenting at a single line reading rate segments of the structured reading lessons having the single-line reading format;
said second set of computer-executable instructions includes computer-executable instructions for capturing single-line reading rate data using the single-line reading rate segments and multi-line reading rate data using the multi-line reading rate segments; and
the computer-readable non-transitory hardware storage medium further contains computer-executable instructions for adjusting the multi-line reading rate separately from the single-line reading rate.

30. A computer-readable non-transitory hardware storage medium according to claim 21, wherein said first set of computer-executable instructions includes computer-executable instructions for presenting at least one multi-line segment of at least one of the structured reading lessons by incremental buildup of text on the display from top to bottom of a presentation window at a first rate equal to or greater than a second rate at which the user has demonstrated satisfactory comprehension as determined by the continual assessing performed by the fifth set of computer-executable instructions.

31. A computer-readable non-transitory hardware storage medium according to claim 30, wherein said first set of computer-executable instructions further includes computer-executable instructions for removing of text from the presentation window at a third rate less than the first rate as a function of the at least one reading comprehension measure and the reading rate data.

32. A computer-readable non-transitory hardware storage medium according to claim 21, wherein said first set of computer-executable instructions includes computer-executable instructions for automatedly varying placement of reading-comprehension questions throughout the segmentation of ones of the structured reading lessons.

33. A computer-readable non-transitory hardware storage medium according to claim 21, further containing computer-executable instructions for assigning pre-reading activities to the user as a function of the at least one reading comprehension measure and the reading rate data.

34. A computer-readable non-transitory hardware storage medium according to claim 33, wherein the user has a current reading rate and the computer-readable hardware storage medium further includes computer-executable instructions for presenting the pre-reading activities to the user at a reading rate that exceeds the current reading rate as a function of the at least one reading comprehension measure and the reading rate data.

35. A computer-readable non-transitory hardware storage medium according to claim 34, further containing computer-executable instructions for varying the pre-reading activities between a word-by-word format and a single-line format as a function of the at least one reading comprehension measure and the reading rate data.

36. A computer-readable non-transitory hardware storage medium according to claim 21, further containing computer-executable instructions for assigning a repeat reading to the user as a function of the at least one reading comprehension measure and the reading rate data, wherein:
the repeat reading is a repeat of one of the reading lessons already presented; and
the one of the structured reading lessons already presented was presented in a first format, the computer-readable non-transitory hardware storage medium further containing computer-executable instructions for presenting the repeat reading in a second format different from the first format.

37. A computer-readable non-transitory hardware storage medium according to claim 36, wherein the one of the structured reading lessons already presented was presented with a first number of questions, the computer-readable non-transitory hardware storage medium further containing computer-executable instructions for presenting the repeat reading with a second number of questions different from the first number of questions.

38. A computer-readable non-transitory hardware storage medium according to claim 21, further containing:
computer-executable instructions for presenting to the user, on the display, a plurality of non-paced reading lessons;
computer-executable instructions for collecting, via the computer, reading comprehension data and reading rate data regarding the plurality of non-paced reading lessons from the user; and
computer-executable instructions for automatedly determining an initial reading rate based on the reading comprehension data and the reading rate data.

39. A computer-readable non-transitory hardware storage medium according to claim 21, further containing:
computer-executable instructions for collecting, via the computer, single-line reading rate data using ones of the reading lessons containing the single-line reading format; and
computer-executable instructions for determining a current single-line reading rate as a function of the multi-line reading rate values, the single-line reading rate data and the comprehension of the user as measured by a plurality of sets of reading-comprehension questions.

40. A computer-readable non-transitory hardware storage medium according to claim 39, wherein said computer-executable instructions for determining of the current single-line reading rate includes computer-executable instructions for raising the current single-line reading rate by an increased increment only when the multi-line reading rate values are quantitatively better than the single-line reading rate data.

41. A method of performing reading fluency training via a computer having a visual display and a user interface, comprising:
presenting to a user, on the visual display, structured reading lessons of multiple formats including a multi-line reading format and a single-line reading format, wherein each of the structured reading lessons includes a set of reading-comprehension questions;
capturing, by the computer, reading rate data for segments of the structured reading lessons presented in multi-line reading format and for segments of the structured reading lessons presented in single-line reading format;

collecting, via the user interface, answers to each set of reading-comprehension questions provided by the user;

using the answers to each set of reading comprehension questions to obtain at least one reading comprehension measure;

continually assessing, via the computer, reading proficiency of the user as a function of the at least one reading comprehension measure and the reading rate data; and dynamically controlling selection of reading lesson presentation format from among the multiple formats based on, at differing times, one, the other, or both, of the reading rate data and the at least one reading comprehension measure; and dynamically controlling the presentation of the structured reading lessons by assigning pre-reading activities to the user as a function of the at least one reading comprehension measure and the reading rate data;

wherein the user has a current reading rate and the method further includes presenting the pre-reading activities to the user at a reading rate that exceeds the current reading rate as a function of the at least one reading comprehension measure and the reading rate data.

42. A computer-readable non-transitory hardware storage medium containing computer-executable instructions for implementing a method of performing reading fluency training via a computer having a visual display and a user interface, said computer-executable instructions comprising:

a first set of computer-executable instructions for presenting to a user, on the visual display, structured reading lessons of multiple formats including a multi-line reading format and a single-line reading format, wherein each of the structured reading lessons includes a set of reading-comprehension questions;

a second set of computer-executable instructions for capturing, by the computer, reading rate data for segments of the structured reading lessons presented in multi-line reading format and for segments of the structured reading lessons presented in single-line reading format;

a third set of computer-executable instructions for collecting, via the user interface, answers to each set of reading-comprehension questions provided by the user;

a fourth set of computer-executable instructions for using the answers to each set of reading comprehension questions to obtain at least one reading comprehension measure;

a fifth set of computer-executable instructions for continually assessing, via the computer, reading proficiency of the user as a function of the at least one reading comprehension measure and the reading rate data; and a sixth set of computer-executable instructions for dynamically controlling selection of reading lesson presentation format from among the multiple formats based on, at differing times, one, the other, or both, of the reading rate data and the at least one reading comprehension measure; and a seventh set of computer-executable instructions for assigning pre-reading activities to the user as a function of the at least one reading comprehension measure and the reading rate data;

wherein the user has a current reading rate and the computer-readable non-transitory hardware storage medium further includes computer-executable instructions for presenting the pre-reading activities to the user at a reading rate that exceeds the current reading rate as a function of the at least one reading comprehension measure and the reading rate data.

43. A computer-readable non-transitory hardware storage medium according to claim 42, wherein said first set of computer-executable instructions includes computer-executable instructions for presenting ones of the structured reading lessons at a first content level, the non-volatile or volatile storage medium further containing computer-executable instructions for changing the first content level to a second level different from the first content level based on the reading rate data and the at least one reading comprehension measure.

44. A computer-readable non-transitory hardware storage medium according to claim 43, wherein the at least one reading comprehension measure includes reading proficiency on at least the most recent one of the structured reading lessons and average reading proficiency over a certain number of most recent ones of the structured reading lessons.

45. A computer-readable non-transitory hardware storage medium according to claim 43, wherein the at least one reading comprehension measure includes a multi-line reading rate measure, the non-volatile or volatile storage medium further containing computer-executable instructions for calculating the multi-line reading rate measure based on proficiency by the user on at least a most recent one of the structured reading lessons.

46. A computer-readable non-transitory hardware storage medium according to claim 43, wherein the at least one reading comprehension measure includes a single-line reading rate measure, the non-volatile or volatile storage medium further containing computer-executable instructions for calculating the multi-line reading rate measure based on proficiency by the user on at least a most recent one of the structured reading lessons.

47. A computer-readable non-transitory hardware storage medium according to claim 43, wherein said fifth set of computer-executable instructions includes computer-executable instructions for comparing the reading proficiency to at least one performance parameter that is a function of grade and content level.

48. A computer-readable non-transitory hardware storage medium according to claim 42, wherein said first set of computer-executable instructions includes computer-executable instructions for presenting ones of the structured reading lessons at a first reading rate, the non-volatile or volatile storage medium further containing computer-executable instructions for changing the first reading rate to a second reading rate different from the first reading rate as a function of the reading rate data and the at least one reading comprehension measure.

49. A computer-readable non-transitory hardware storage medium according to claim 48, wherein said computer-executable instructions for changing of the first reading rate to a second reading rate includes computer-executable instructions for incrementing said first reading rate by a predetermined increment, the non-volatile or volatile storage medium further containing computer-executable instructions for selecting the predetermined increment from a plurality of predetermined differing increments as a function of the reading rate data and the at least one reading comprehension measure.

50. A computer-readable non-transitory hardware storage medium according to claim 42, wherein:

said first set of computer-executable instructions includes computer-executable instructions for presenting at a multi-line reading rate segments of the structured reading lessons having the multi-line reading format and presenting at a single line reading rate segments of the structured reading lessons having the single-line reading format;

said second set of computer-executable instructions includes computer-executable instructions for capturing single-line reading rate data using the single-line reading rate segments and multi-line reading rate data using the multi-line reading rate segments; and the non-volatile or volatile storage medium further contains computer-executable instructions for adjusting the multi-line reading rate separately from the single-line reading rate.

51. A computer-readable non-transitory hardware storage medium according to claim 42, wherein said first set of computer-executable instructions includes computer-executable instructions for presenting at least one multi-line segment of at least one of the structured reading lessons by incremental buildup of text on the display from top to bottom of a presentation window at a first rate equal to or greater than a second rate at which the user has demonstrated satisfactory comprehension as determined by the continual assessing performed by the fifth set of computer-executable instructions.

52. A computer-readable non-transitory hardware storage medium according to claim 51, wherein said first set of computer-executable instructions further includes computer-executable instructions for removing of text from the presentation window at a third rate less than the first rate as a function of the at least one reading comprehension measure and the reading rate data.

53. A computer-readable non-transitory hardware storage medium according to claim 42, wherein said first set of computer-executable instructions includes computer-executable instructions for automatedly varying lengths segmentation of ones of the structured reading lessons in a manner that tends to sustain attention by the user based on the at least one reading comprehension measure.

54. A computer-readable non-transitory hardware storage medium according to claim 53, wherein said first set of computer-executable instructions includes computer-executable instructions for automatedly varying placement of reading-comprehension questions throughout the segmentation of ones of the structured reading lessons.

55. A computer-readable non-transitory hardware storage medium according to claim 53, wherein said first set of computer-executable instructions includes computer-executable instructions for varying the structured reading lessons between a first format having a first number of text segments and reading comprehension questions interspersed among the first number of text segments and a second format having a second number of text segments and reading comprehension questions following only the second number of text segments, wherein the second number is different from the first number.

56. A computer-readable non-transitory hardware storage medium according to claim 42, further containing computer-executable instructions for varying the pre-reading activities between a word-by-word format and a single-line format as a function of the at least one reading comprehension measure and the reading rate data.

57. A computer-readable non-transitory hardware storage medium according to claim 42, further containing computer-executable instructions for assigning a repeat reading to the user as a function of the at least one reading comprehension measure and the reading rate data, wherein:

the repeat reading is a repeat of one of the reading lessons already presented; and the one of the structured reading lessons already presented was presented in a first format, the non-volatile or volatile storage medium further containing computer-executable instructions for presenting the repeat reading in a second format different from the first format.

58. A computer-readable non-transitory hardware storage medium according to claim 56, wherein the one of the structured reading lessons already presented was presented with a first number of questions, the non-volatile or volatile storage medium further containing computer-executable instructions for presenting the repeat reading with a second number of questions different from the first number of questions.

59. A computer-readable non-transitory hardware storage medium according to claim 42, further containing:

computer-executable instructions for presenting to the user, on the display, a plurality of non-paced reading lessons;

computer-executable instructions for collecting, via the computer, reading comprehension data and reading rate data regarding the plurality of non-paced reading lessons from the user; and computer-executable instructions for automatedly determining an initial reading rate based on the reading comprehension data and the reading rate data.

60. A computer-readable non-transitory hardware storage medium according to claim 42, further containing:

computer-executable instructions for collecting, via the computer, single-line reading rate data using ones of the reading lessons containing the single-line reading format; and computer-executable instructions for determining a current single-line reading rate as a function of the multi-line reading rate values, the single-line reading rate data and the comprehension of the user as measured by a plurality of sets of reading-comprehension questions.

61. A computer-readable non-transitory hardware storage medium according to claim 59, wherein said computer-executable instructions for determining of the current single-line reading rate includes computer-executable instructions for raising the current single-line reading rate by an increased increment only when the multi-line reading rate values are quantitatively better than the single-line reading rate data.

62. A method of performing reading fluency training via a computer having a visual display and a user interface, comprising:

presenting to a user, on the visual display, structured reading lessons of multiple formats including a multi-line reading format and a single-line reading format, wherein each of the structured reading lessons includes a set of reading-comprehension questions;

capturing, by the computer, reading rate data for segments of the structured reading lessons presented in multi-line reading format and for segments of the structured reading lessons presented in single-line reading format;

collecting, via the user interface, answers to each set of reading-comprehension questions provided by the user;

using the answers to each set of reading comprehension questions to obtain at least one reading comprehension measure;

continually assessing, via the computer, reading proficiency of the user as a function of the at least one reading comprehension measure and the reading rate data; and dynamically controlling selection of reading lesson presentation format from among the multiple formats based on, at differing times, one, the other, or both, of the reading rate data and the at least one reading comprehension measure; and dynamically controlling the presentation of the structured reading lessons by assigning a repeat reading to the user as a function of the at least one reading comprehension measure and the reading rate data, wherein:
the repeat reading is a repeat of one of the structured reading lessons already presented; and
the one of the structured reading lessons already presented was presented in a first format and said dynamic controlling of the presentation includes presenting the repeat reading in a second format different from the first format.

63. A computer-readable non-transitory hardware storage medium containing computer-executable instructions for implementing a method of performing reading fluency training via a computer having a visual display and a user interface, said computer-executable instructions comprising:
a first set of computer-executable instructions for presenting to a user, on the visual display, structured reading lessons of multiple formats including a multi-line reading format and a single-line reading format, wherein each of the structured reading lessons includes a set of reading-comprehension questions;
a second set of computer-executable instructions for capturing, by the computer, reading rate data for segments of the structured reading lessons presented in multi-line reading format and for segments of the structured reading lessons presented in single-line reading format;
a third set of computer-executable instructions for collecting, via the user interface, answers to each set of reading-comprehension questions provided by the user;
a fourth set of computer-executable instructions for using the answers to each set of reading comprehension questions to obtain at least one reading comprehension measure;
a fifth set of computer-executable instructions for continually assessing, via the computer, reading proficiency of the user as a function of the at least one reading comprehension measure and the reading rate data;
a sixth set of computer-executable instructions for dynamically controlling selection of reading lesson presentation format from among the multiple formats based on, at differing times, one, the other, or both, of the reading rate data and the at least one reading comprehension measure; and
a seventh set of computer-executable instructions for assigning a repeat reading to the user as a function of the at least one reading comprehension measure and the reading rate data, wherein:
the repeat reading is a repeat of one of the reading lessons already presented; and
the one of the structured reading lessons already presented was presented in a first format, the computer-readable non-transitory hardware storage medium further containing computer-executable instructions for presenting the repeat reading in a second format different from the first format.

64. A computer-readable non-transitory hardware storage medium according to claim 63, wherein said first set of computer-executable instructions includes computer-executable instructions for presenting ones of the structured reading lessons at a first content level, the non-volatile or volatile storage medium further containing computer-executable instructions for changing the first content level to a second level different from the first content level based on the reading rate data and the at least one reading comprehension measure.

65. A computer-readable non-transitory hardware storage medium according to claim 64, wherein the at least one reading comprehension measure includes reading proficiency on at least the most recent one of the structured reading lessons and average reading proficiency over a certain number of most recent ones of the structured reading lessons.

66. A computer-readable non-transitory hardware storage medium according to claim 64, wherein the at least one reading comprehension measure includes a multi-line reading rate measure, the non-volatile or volatile storage medium further containing computer-executable instructions for calculating the multi-line reading rate measure based on proficiency by the user on at least a most recent one of the structured reading lessons.

67. A computer-readable non-transitory hardware storage medium according to claim 64, wherein the at least one reading comprehension measure includes a single-line reading rate measure, the non-volatile or volatile storage medium further containing computer-executable instructions for calculating the multi-line reading rate measure based on proficiency by the user on at least a most recent one of the structured reading lessons.

68. A computer-readable non-transitory hardware storage medium according to claim 64, wherein said fifth set of computer-executable instructions includes computer-executable instructions for comparing the reading proficiency to at least one performance parameter that is a function of grade and content level.

69. A computer-readable non-transitory hardware storage medium according to claim 63, wherein said first set of computer-executable instructions includes computer-executable instructions for presenting ones of the structured reading lessons at a first reading rate, the non-volatile or volatile storage medium further containing computer-executable instructions for changing the first reading rate to a second reading rate different from the first reading rate as a function of the reading rate data and the at least one reading comprehension measure.

70. A computer-readable non-transitory hardware storage medium according to claim 69, wherein said computer-executable instructions for changing of the first reading rate to a second reading rate includes computer-executable instructions for incrementing said first reading rate by a predetermined increment, the non-volatile or volatile storage medium further containing computer-executable instructions for selecting the predetermined increment from a plurality of predetermined differing increments as a function of the reading rate data and the at least one reading comprehension measure.

71. A computer-readable non-transitory hardware storage medium according to claim 63, wherein:
said first set of computer-executable instructions includes computer-executable instructions for presenting at a multi-line reading rate segments of the structured reading lessons having the multi-line reading format and presenting at a single line reading rate segments of the structured reading lessons having the single-line reading format;
said second set of computer-executable instructions includes computer-executable instructions for capturing single-line reading rate data using the single-line reading rate segments and multi-line reading rate data using the multi-line reading rate segments; and
the non-volatile or volatile storage medium further contains computer-executable instructions for adjusting the multi-line reading rate separately from the single-line reading rate.

72. A computer-readable non-transitory hardware storage medium according to claim 63, wherein said first set of computer-executable instructions includes computer-executable instructions for presenting at least one multi-line segment of at least one of the structured reading lessons by incremental buildup of text on the display from top to bottom of a presentation window at a first rate equal to or greater than a second rate at which the user has demonstrated satisfactory comprehension as determined by the continual assessing performed by the fifth set of computer-executable instructions.

73. A computer-readable non-transitory hardware storage medium according to claim 72, wherein said first set of computer-executable instructions further includes computer-executable instructions for removing of text from the presentation window at a third rate less than the first rate as a function of the at least one reading comprehension measure and the reading rate data.

74. A computer-readable non-transitory hardware storage medium according to claim 63, wherein said first set of computer-executable instructions includes computer-executable instructions for automatedly varying lengths segmentation of ones of the structured reading lessons in a manner that tends to sustain attention by the user based on the at least one reading comprehension measure.

75. A computer-readable non-transitory hardware storage medium according to claim 74, wherein said first set of computer-executable instructions includes computer-executable instructions for automatedly varying placement of reading-comprehension questions throughout the segmentation of ones of the structured reading lessons.

76. A computer-readable non-transitory hardware storage medium according to claim 63, further containing computer-executable instructions for assigning pre-reading activities to the user as a function of the at least one reading comprehension measure and the reading rate data.

77. A computer-readable non-transitory hardware storage medium according to claim 63, wherein the one of the structured reading lessons already presented was presented with a first number of questions, the non-volatile or volatile storage medium further containing computer-executable instructions for presenting the repeat reading with a second number of questions different from the first number of questions.

78. A computer-readable non-transitory hardware storage medium according to claim 63, further containing:
   computer-executable instructions for presenting to the user, on the display, a plurality of non-paced reading lessons;
   computer-executable instructions for collecting, via the computer, reading comprehension data and reading rate data regarding the plurality of non-paced reading lessons from the user; and
   computer-executable instructions for automatedly determining an initial reading rate based on the reading comprehension data and the reading rate data.

79. A computer-readable non-transitory hardware storage medium according to claim 63, further containing:
   computer-executable instructions for collecting, via the computer, single-line reading rate data using ones of the reading lessons containing the single-line reading format; and
   computer-executable instructions for determining a current single-line reading rate as a function of the multi-line reading rate values, the single-line reading rate data and the comprehension of the user as measured by a plurality of sets of reading-comprehension questions.

80. A computer-readable non-transitory hardware storage medium according to claim 79, wherein said computer-executable instructions for determining of the current single-line reading rate includes computer-executable instructions for raising the current single-line reading rate by an increased increment only when the multi-line reading rate values are quantitatively better than the single-line reading rate data.

81. A method of performing reading fluency training via a computer having a visual display and a user interface, comprising:
   presenting to a user, on the visual display, structured reading lessons of multiple formats including a multi-line reading format and a single-line reading format, wherein each of the structured reading lessons includes a set of reading-comprehension questions;
   capturing, by the computer, reading rate data for segments of the structured reading lessons presented in multi-line reading format and for segments of the structured reading lessons presented in single-line reading format;
   collecting, via the user interface, answers to each set of reading-comprehension questions provided by the user;
   using the answers to each set of reading comprehension questions to obtain at least one reading comprehension measure;
   continually assessing, via the computer, reading proficiency of the user as a function of the at least one reading comprehension measure and the reading rate data; and
   dynamically controlling selection of reading lesson presentation format from among the multiple formats based on, at differing times, one, the other, or both, of the reading rate data and the at least one reading comprehension measure;
   the method further comprising:
      collecting, via the computer, multi-line reading rate data using ones of the structured reading lessons containing the multi-line reading format;
      collecting, via the computer, single-line reading rate data using ones of the structured reading lessons containing the single-line reading format; and
      determining a current single-line reading rate as a function of the multi-line reading rate data, the single-line reading rate data and the comprehension of the user as measured by a plurality of sets of reading-comprehension questions.

82. A computer-readable non-transitory hardware storage medium containing computer-executable instructions for implementing a method of performing reading fluency training via a computer having a visual display and a user interface, said computer-executable instructions comprising:
   a first set of computer-executable instructions for presenting to a user, on the visual display, structured reading lessons of multiple formats including a multi-line reading format and a single-line reading format, wherein each of the structured reading lessons includes a set of reading-comprehension questions;
   a second set of computer-executable instructions for capturing, by the computer, reading rate data for segments of the structured reading lessons presented in multi-line reading format and for segments of the structured reading lessons presented in single-line reading format;
   a third set of computer-executable instructions for collecting, via the user interface, answers to each set of reading-comprehension questions provided by the user;
   a fourth set of computer-executable instructions for using the answers to each set of reading comprehension questions to obtain at least one reading comprehension measure;
   a fifth set of computer-executable instructions for continually assessing, via the computer, reading proficiency of the user as a function of the at least one reading comprehension measure and the reading rate data; and a sixth set of computer-executable instructions for dynamically controlling selection of reading lesson presentation format from among the multiple formats based on, at differing times, one, the other, or both, of the reading rate data and the at least one reading comprehension measure;

wherein the computer-readable hardware storage medium further contains:

computer-executable instructions for collecting, via the computer, single-line reading rate data using ones of the reading lessons containing the single-line reading format; and computer-executable instructions for determining a current single-line reading rate as a function of the multi-line reading rate values, the single-line reading rate data and the comprehension of the user as measured by a plurality of sets of reading-comprehension questions.

83. A computer-readable non-transitory hardware storage medium according to claim 82, wherein said first set of computer-executable instructions includes computer-executable instructions for presenting ones of the structured reading lessons at a first content level, the computer-readable hardware storage medium further containing computer-executable instructions for changing the first content level to a second level different from the first content level based on the reading rate data and the at least one reading comprehension measure.

84. A computer-readable non-transitory hardware storage medium according to claim 83, wherein the at least one reading comprehension measure includes reading proficiency on at least the most recent one of the structured reading lessons and average reading proficiency over a certain number of most recent ones of the structured reading lessons.

85. A computer-readable non-transitory hardware storage medium according to claim 83, wherein the at least one reading comprehension measure includes a multi-line reading rate measure, the computer-readable hardware storage medium further containing computer-executable instructions for calculating the multi-line reading rate measure based on proficiency by the user on at least a most recent one of the structured reading lessons.

86. A computer-readable non-transitory hardware storage medium according to claim 83, wherein the at least one reading comprehension measure includes a single-line reading rate measure, the computer-readable hardware storage medium further containing computer-executable instructions for calculating the multi-line reading rate measure based on proficiency by the user on at least a most recent one of the structured reading lessons.

87. A computer-readable non-transitory hardware storage medium according to claim 83, wherein said fifth set of computer-executable instructions includes computer-executable instructions for comparing the reading proficiency to at least one performance parameter that is a function of grade and content level.

88. A computer-readable non-transitory hardware storage medium according to claim 82, wherein said first set of computer-executable instructions includes computer-executable instructions for presenting ones of the structured reading lessons at a first reading rate, the computer-readable hardware storage medium further containing computer-executable instructions for changing the first reading rate to a second reading rate different from the first reading rate as a function of the reading rate data and the at least one reading comprehension measure.

89. A computer-readable non-transitory hardware storage medium according to claim 88, wherein said computer-executable instructions for changing of the first reading rate to a second reading rate includes computer-executable instructions for incrementing said first reading rate by a predetermined increment, the computer-readable hardware storage medium further containing computer-executable instructions for selecting the predetermined increment from a plurality of predetermined differing increments as a function of the reading rate data and the at least one reading comprehension measure.

90. A computer-readable non-transitory hardware storage medium according to claim 82, wherein:

said first set of computer-executable instructions includes computer-executable instructions for presenting at a multi-line reading rate segments of the structured reading lessons having the multi-line reading format and presenting at a single line reading rate segments of the structured reading lessons having the single-line reading format;

said second set of computer-executable instructions includes computer-executable instructions for capturing single-line reading rate data using the single-line reading rate segments and multi-line reading rate data using the multi-line reading rate segments; and the computer-readable hardware storage medium further contains computer-executable instructions for adjusting the multi-line reading rate separately from the single-line reading rate.

91. A computer-readable non-transitory hardware storage medium according to claim 82, wherein said first set of computer-executable instructions includes computer-executable instructions for presenting at least one multi-line segment of at least one of the structured reading lessons by incremental buildup of text on the display from top to bottom of a presentation window at a first rate equal to or greater than a second rate at which the user has demonstrated satisfactory comprehension as determined by the continual assessing performed by the fifth set of computer-executable instructions.

92. A computer-readable non-transitory hardware storage medium according to claim 91, wherein said first set of computer-executable instructions further includes computer-executable instructions for removing of text from the presentation window at a third rate less than the first rate as a function of the at least one reading comprehension measure and the reading rate data.

93. A computer-readable non-transitory hardware storage medium according to claim 82, wherein said first set of computer-executable instructions includes computer-executable instructions for automatedly varying lengths segmentation of ones of the structured reading lessons in a manner that tends to sustain attention by the user based on the at least one reading comprehension measure.

94. A computer-readable non-transitory hardware storage medium according to claim 93, wherein said first set of computer-executable instructions includes computer-executable instructions for automatedly varying placement of reading-comprehension questions throughout the segmentation of ones of the structured reading lessons.

95. A computer-readable non-transitory hardware storage medium according to claim 93, wherein said first set of computer-executable instructions includes computer-executable instructions for varying the structured reading lessons between a first format having a first number of text segments and reading comprehension questions interspersed among the first number of text segments and a second format having a second number of text segments and reading comprehension questions following only the second number of text segments, wherein the second number is different from the first number.

96. A computer-readable non-transitory hardware storage medium according to claim 82, further containing computer-executable instructions for assigning pre-reading activities to the user as a function of the at least one reading comprehension measure and the reading rate data.

97. A computer-readable non-transitory hardware storage medium according to claim 96, wherein the user has a current reading rate and the computer-readable hardware storage medium further includes computer-executable instructions for presenting the pre-reading activities to the user at a reading rate that exceeds the current reading rate as a function of the at least one reading comprehension measure and the reading rate data.

98. A computer-readable non-transitory hardware storage medium according to claim 97, further containing computer-executable instructions for varying the pre-reading activities between a word-by-word format and a single-line format as a function of the at least one reading comprehension measure and the reading rate data.

99. A computer-readable non-transitory hardware storage medium according to claim 82, further containing computer-executable instructions for assigning a repeat reading to the user as a function of the at least one reading comprehension measure and the reading rate data, wherein:
   the repeat reading is a repeat of one of the reading lessons already presented; and
   the one of the structured reading lessons already presented was presented in a first format, the computer-readable hardware storage medium further containing computer-executable instructions for presenting the repeat reading in a second format different from the first format.

100. A computer-readable non-transitory hardware storage medium according to claim 99, wherein the one of the structured reading lessons already presented was presented with a first number of questions, the computer-readable hardware storage medium further containing computer-executable instructions for presenting the repeat reading with a second number of questions different from the first number of questions.

101. A computer-readable non-transitory hardware storage medium according to claim 82, further containing:
   computer-executable instructions for presenting to the user, on the display, a plurality of non-paced reading lessons;
   computer-executable instructions for collecting, via the computer, reading comprehension data and reading rate data regarding the plurality of non-paced reading lessons from the user; and
   computer-executable instructions for automatedly determining an initial reading rate based on the reading comprehension data and the reading rate data.

102. A computer-readable non-transitory hardware storage medium according to claim 82, wherein said computer-executable instructions for determining of the current single-line reading rate includes computer-executable instructions for raising the current single-line reading rate by an increased increment only when the multi-line reading rate values are quantitatively better than the single-line reading rate data.

* * * * *